Nov. 9, 1943.  C. KIRCHNER  2,333,797
METHOD AND APPARATUS FOR MAKING SPIRAL SPRINGS
Filed Aug. 11, 1941  15 Sheets-Sheet 1
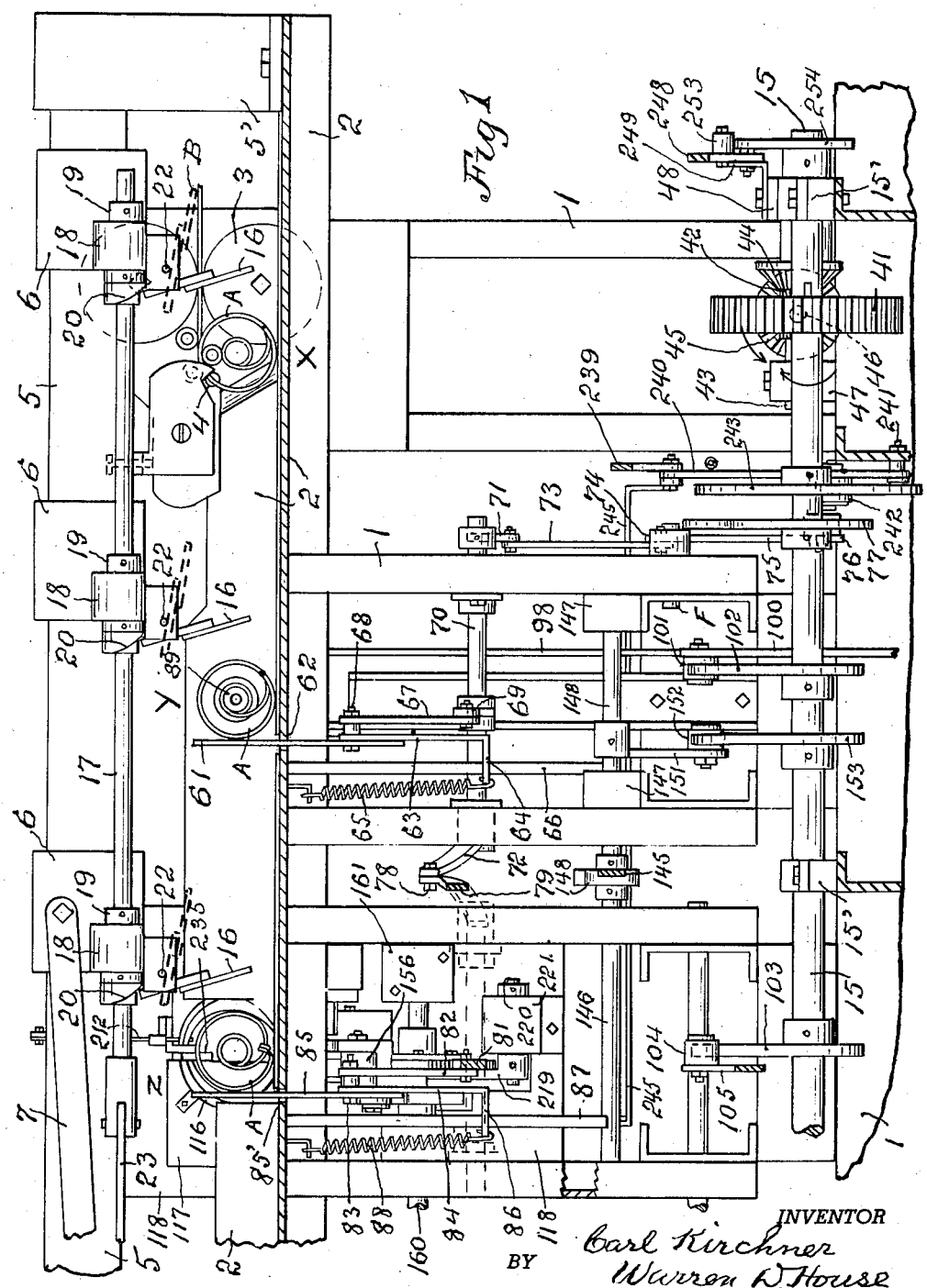
INVENTOR
Carl Kirchner
BY Warren D. House
His ATTORNEY

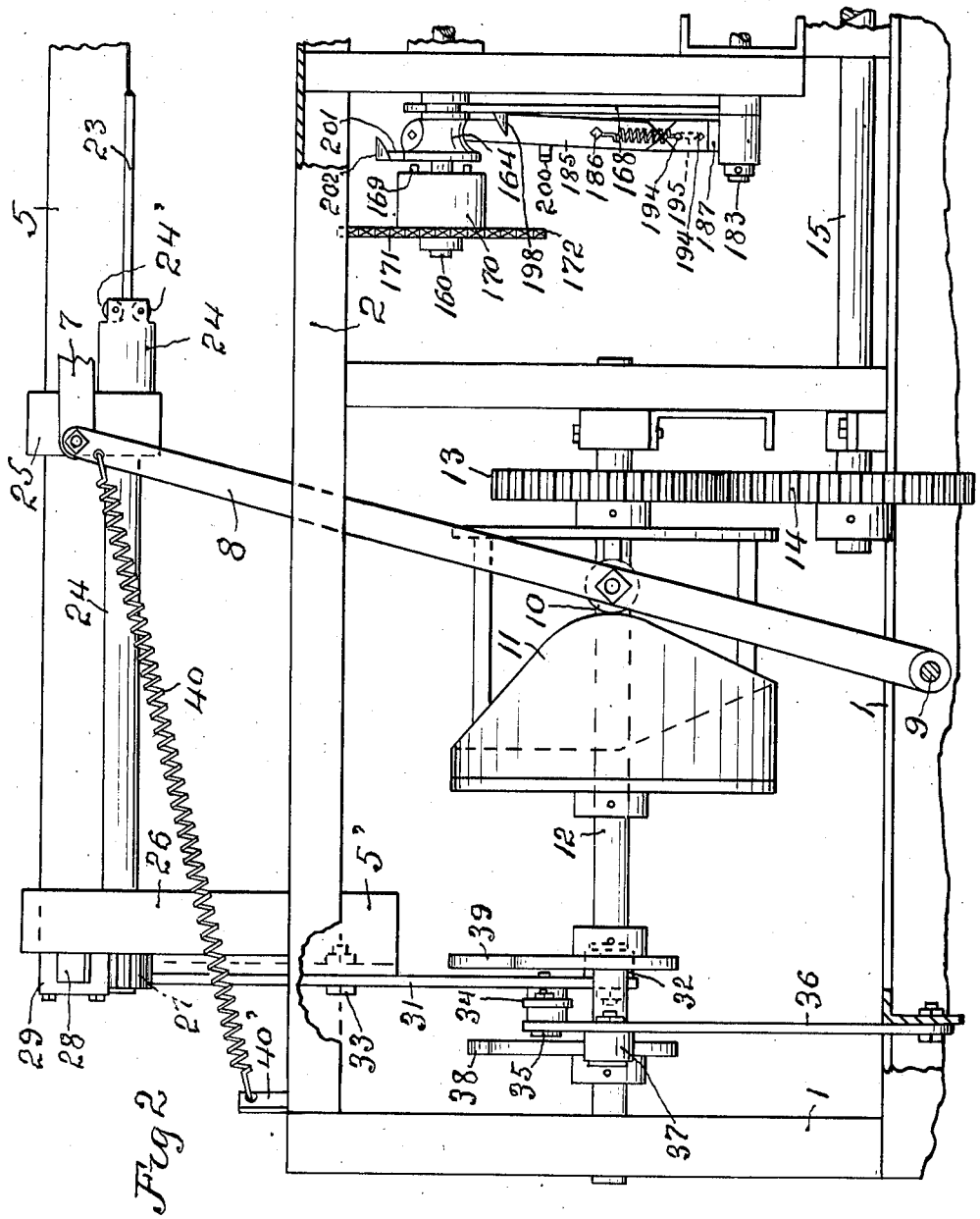

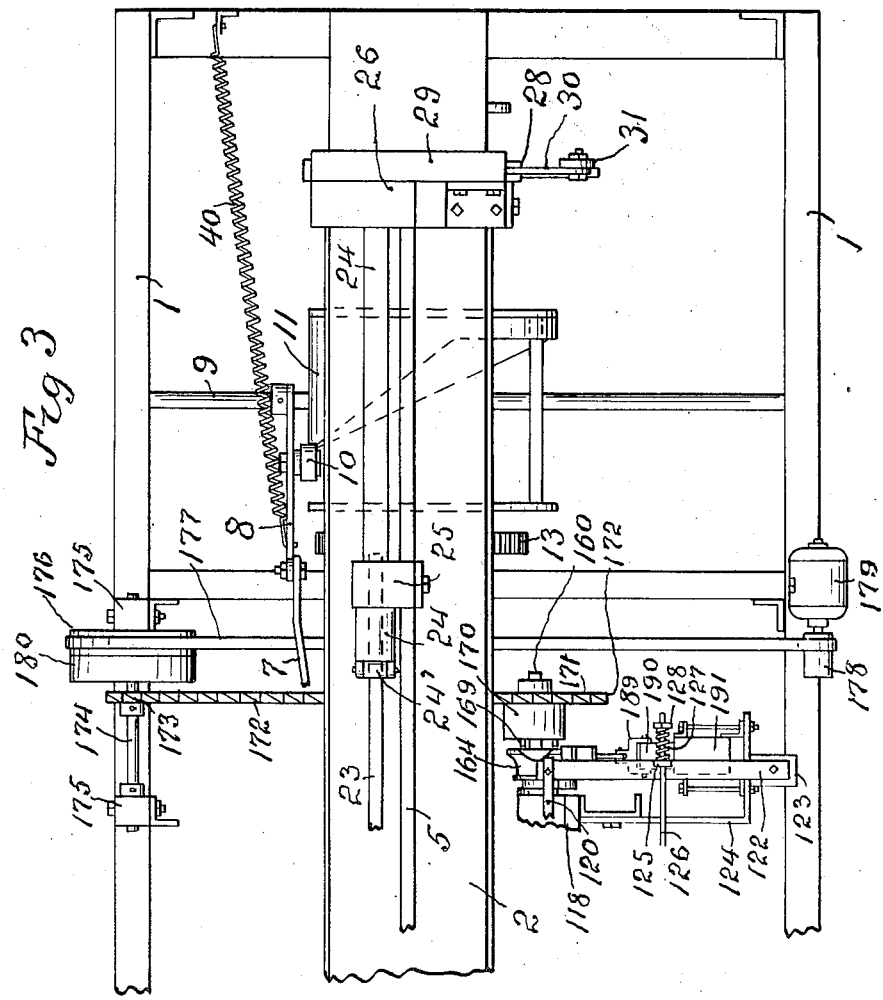

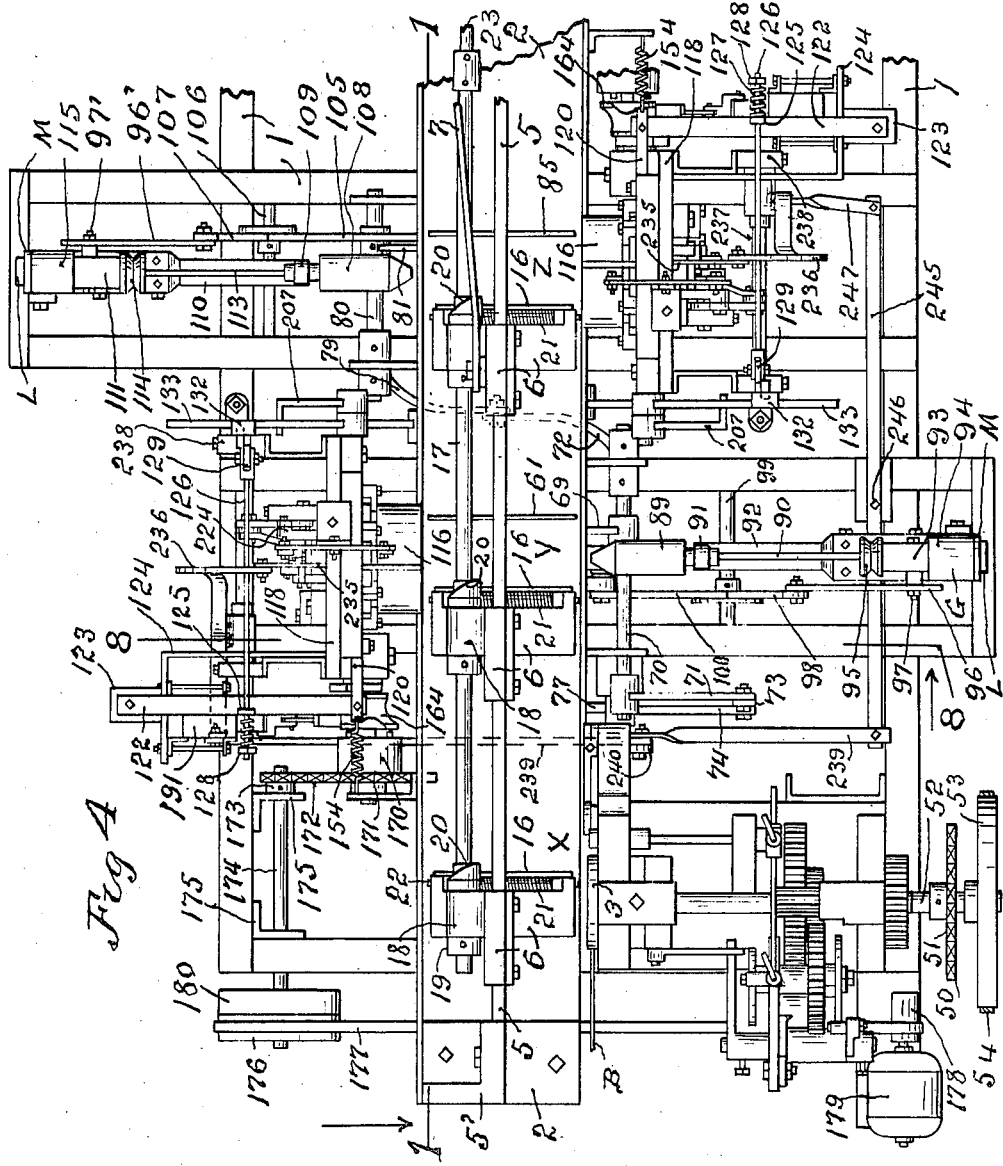

Nov. 9, 1943.    C. KIRCHNER    2,333,797
METHOD AND APPARATUS FOR MAKING SPIRAL SPRINGS
Filed Aug. 11, 1941    15 Sheets-Sheet 5
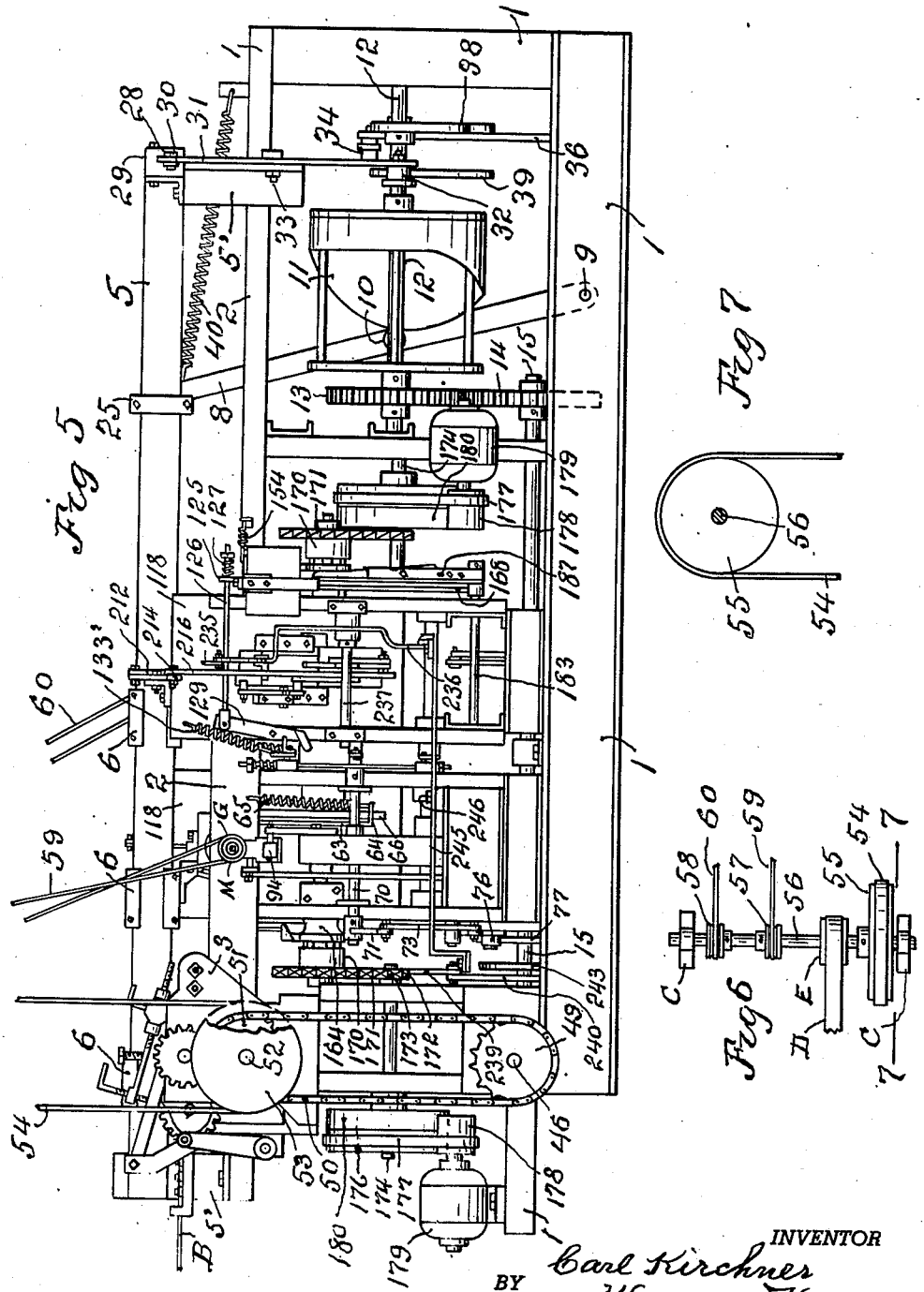
INVENTOR
Carl Kirchner
BY Warren N. House
His ATTORNEY Nov. 9, 1943. C. KIRCHNER 2,333,797
METHOD AND APPARATUS FOR MAKING SPIRAL SPRINGS
Filed Aug. 11, 1941 15 Sheets-Sheet 6

INVENTOR
Carl Kirchner
BY Warren D. House
His ATTORNEY

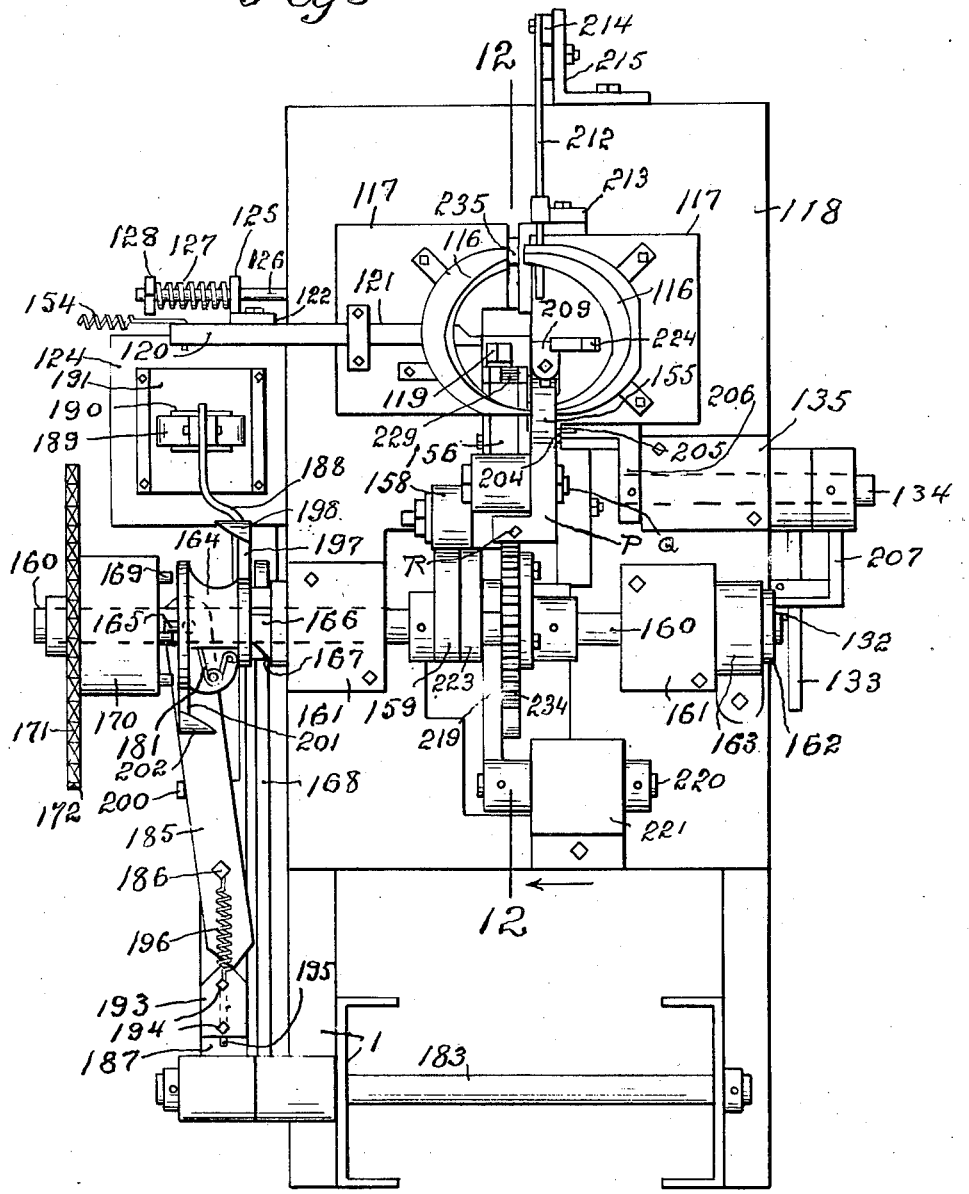

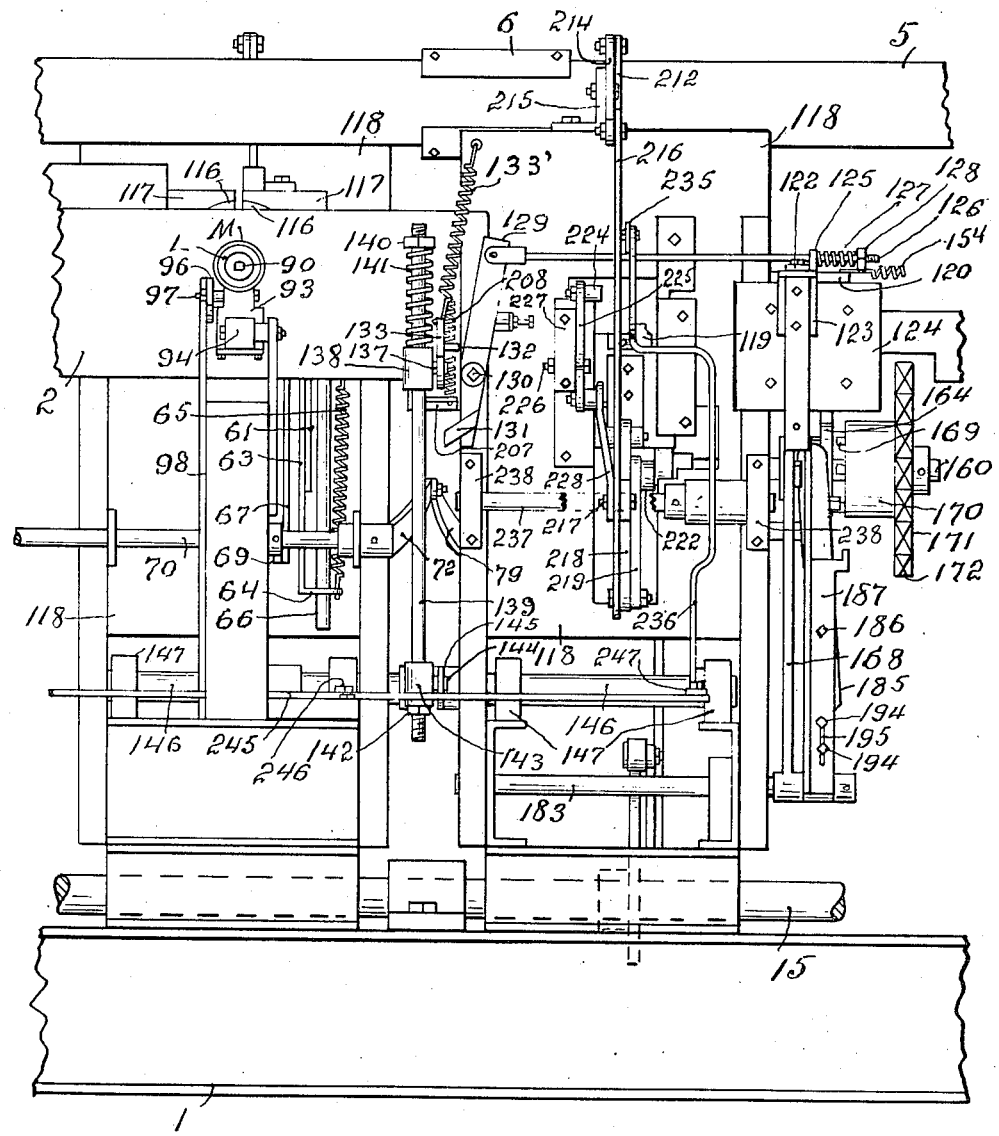

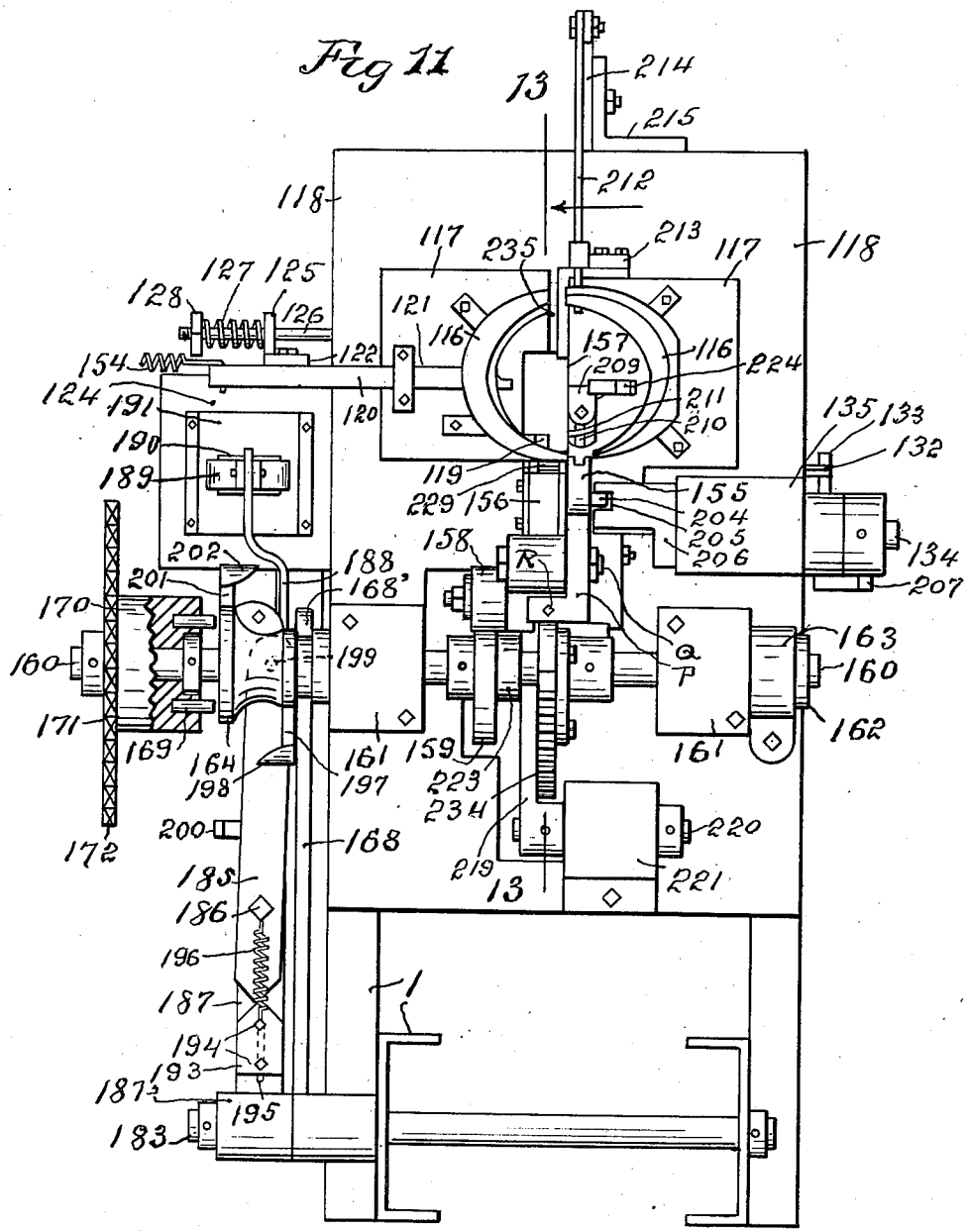

Nov. 9, 1943.                C. KIRCHNER                2,333,797
           METHOD AND APPARATUS FOR MAKING SPIRAL SPRINGS
                     Filed Aug. 11, 1941        15 Sheets-Sheet 10
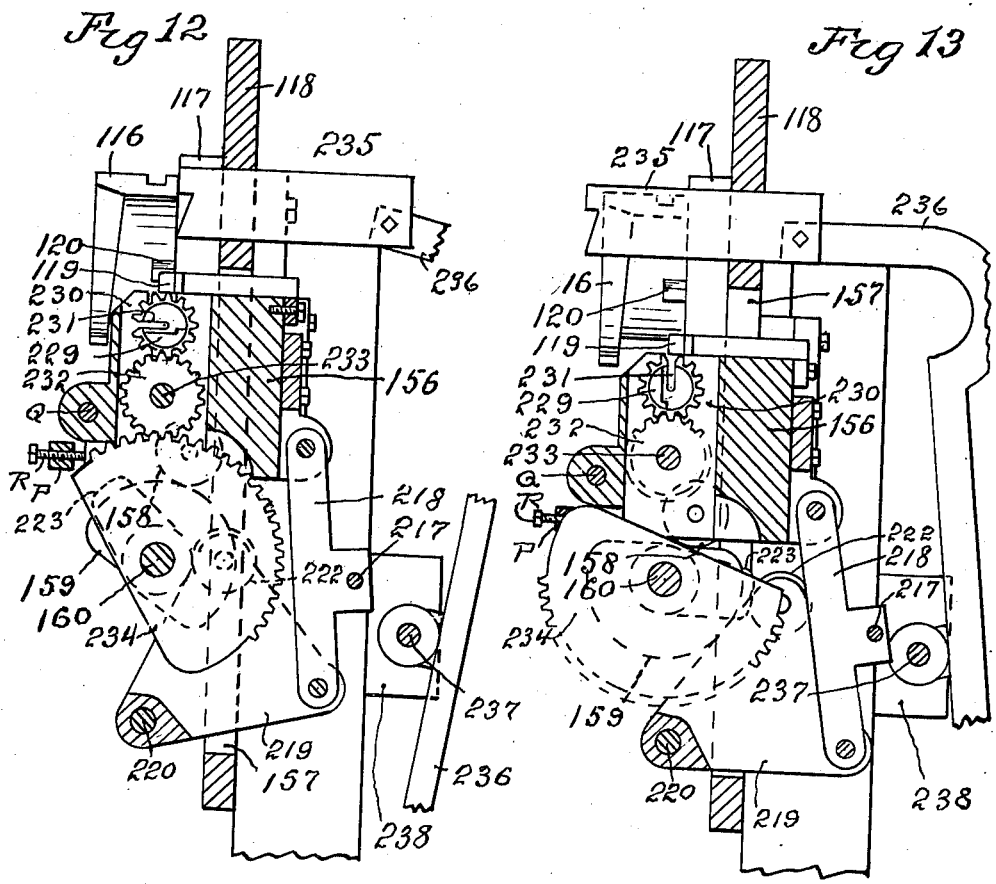
Carl Kirchner  INVENTOR
BY  Warren L. House
His ATTORNEY Nov. 9, 1943.   C. KIRCHNER   2,333,797
METHOD AND APPARATUS FOR MAKING SPIRAL SPRINGS
Filed Aug. 11, 1941   15 Sheets-Sheet 12
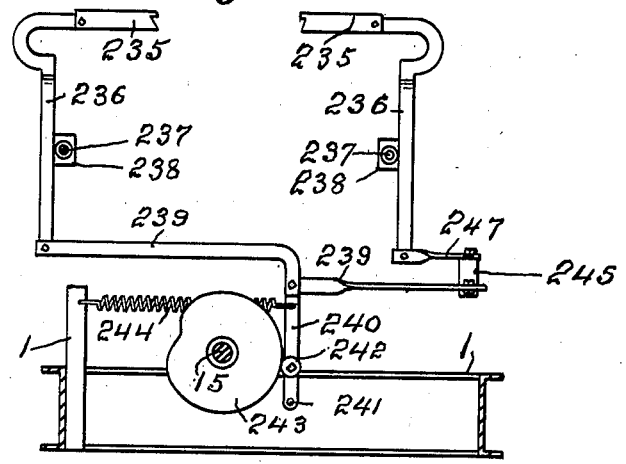
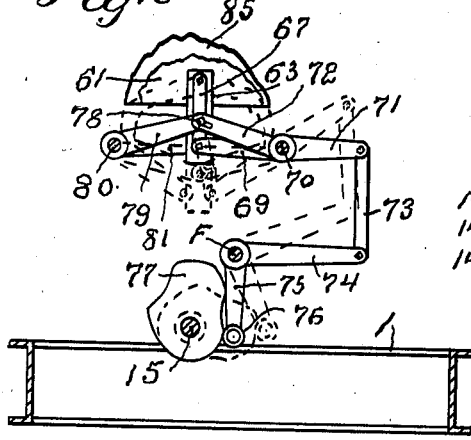
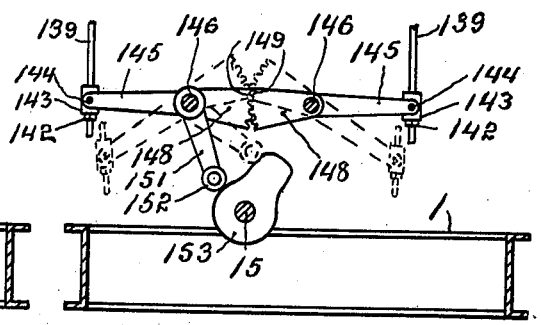
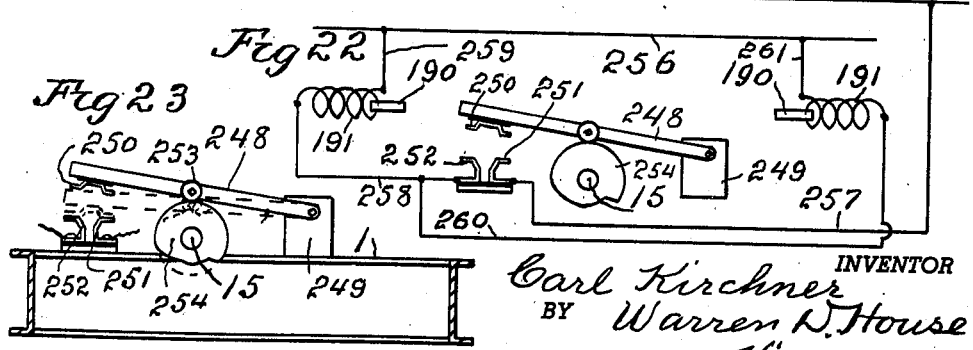
INVENTOR
Carl Kirchner
BY Warren D. House
His ATTORNEY

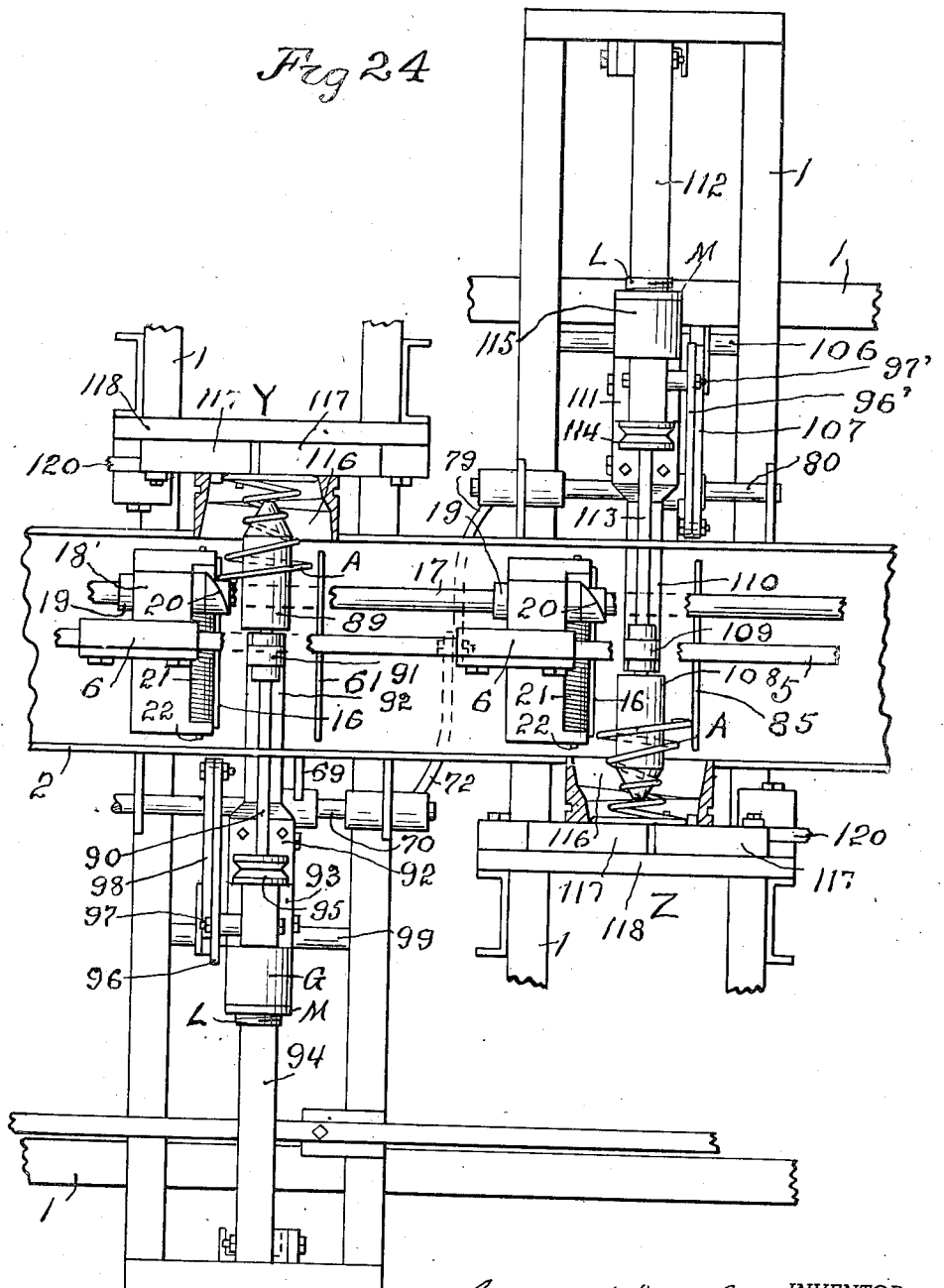

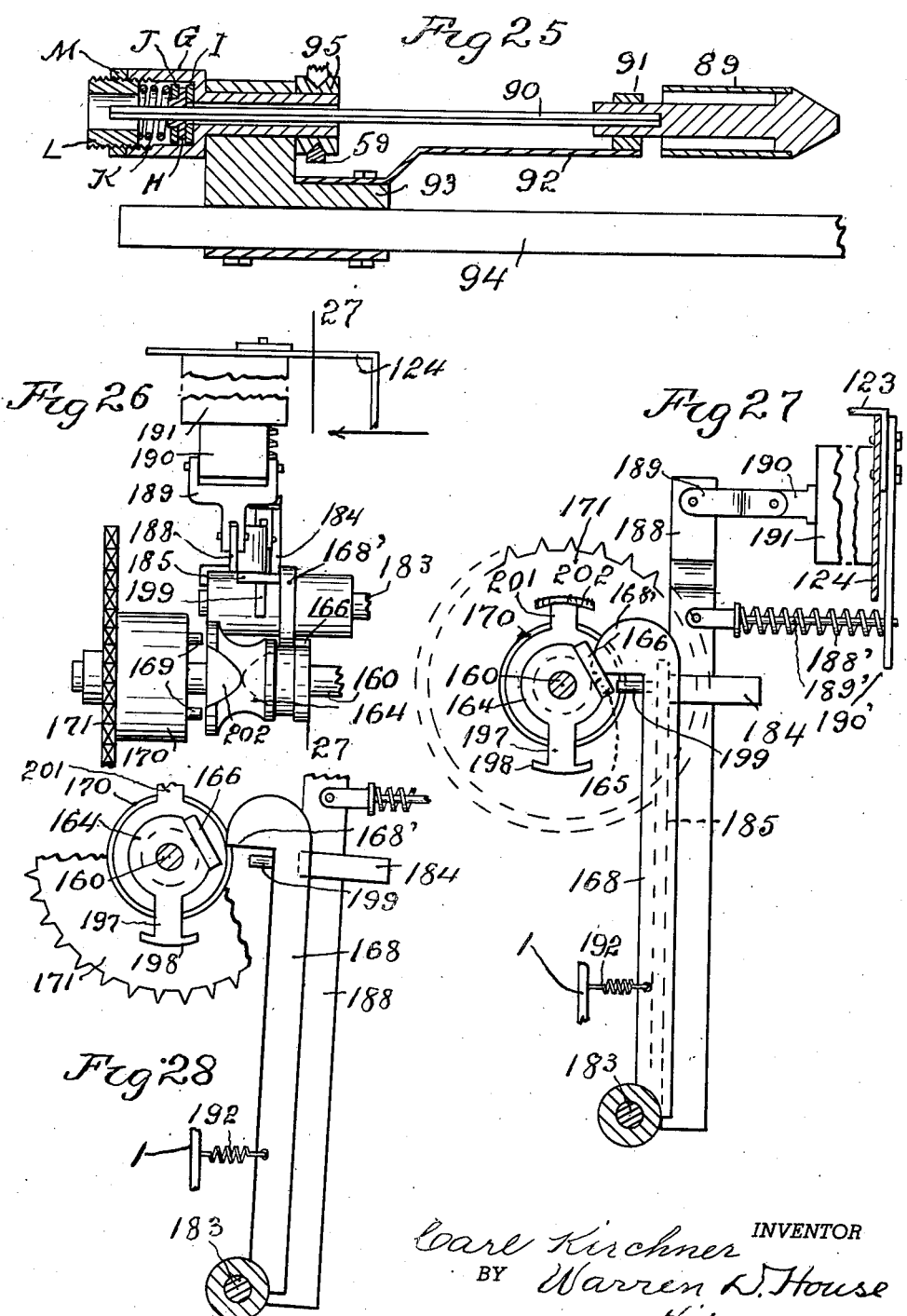

Nov. 9, 1943.   C. KIRCHNER   2,333,797
METHOD AND APPARATUS FOR MAKING SPIRAL SPRINGS
Filed Aug. 11, 1941   15 Sheets-Sheet 15
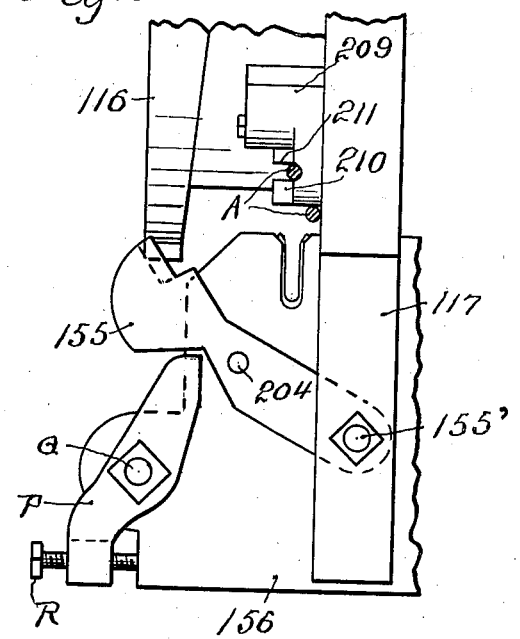
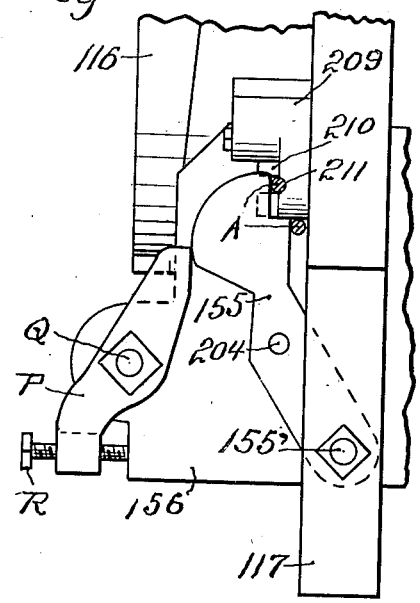
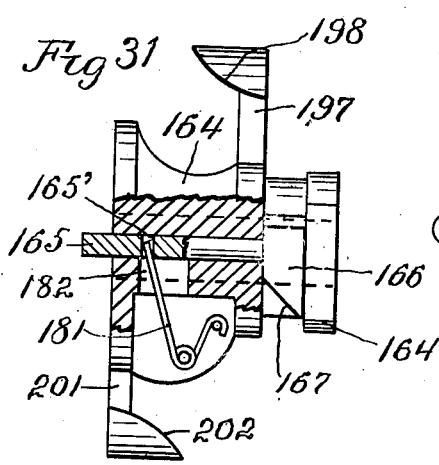
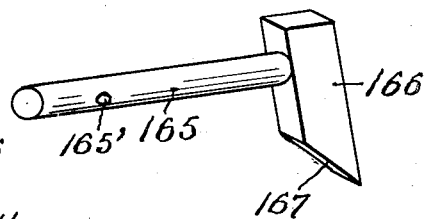
Carl Kirchner INVENTOR
BY Warren D. House
His ATTORNEY Patented Nov. 9, 1943

2,333,797

UNITED STATES PATENT OFFICE 2,333,797

METHOD AND APPARATUS FOR MAKING SPIRAL SPRINGS

Carl Kirchner, Carthage, Mo., assignor to Leggett and Platt Spring Bed and Manufacturing Company, Carthage, Mo., a corporation of Missouri Application August 11, 1941, Serial No. 406,362

17 Claims. (Cl. 140—78)

My invention relates to improvements in methods and apparatus for making spiral springs. It relates to the making of the single or double cone type, having one or both ends knotted, and which springs are commonly used in mattresses, seats and seat backs.

One object of my invention is the provision of a novel method and apparatus for transferring a spiral spring to a location where one end is to be knotted.

Another object of my invention is the provision of a novel method and apparatus for transferring a spiral spring consecutively to two locations where its ends are to be consecutively knotted.

Another object is the provision of a novel method and apparatus by which the spiral spring is made to roll or slide self supported on a pathway to a location where one end is to be knotted.

Another object is the provision of a novel method and apparatus by which the spiral spring is made to roll or slide on a pathway to two locations consecutively at which its ends are to be consecutively knotted.

Another object of my invention is the provision of novel means for frictionally engaging and turning a spring on its axis to a proper position for knotting one end of the spring.

A further object is the provision of novel means for consecutively frictionally engaging and turning a spring on its axis to two positions for consecutively knotting the ends of the spring.

Still another object of my invention is the provision of an apparatus of the kind described, which is, considering the functions which it automatically performs, relatively simple, durable, not likely to get out of order, and which is very efficient in its operation.

One advantage obtained by the employment of my improved novel means for transferring the spiral spring from one location to another by causing the spring to roll or slide self supported on a pathway, is that the same transferring means may be employed, without alteration of any of its parts for spiral springs having, within broad limitations, different lengths, different diameters of coils, and different leads of the coils, thus adapting the machine or apparatus to a very large variety of spiral springs of different conformations and sizes.

In many machines or apparatus of this character, now on the market, or in use, the spiral springs are transported by grippers which embrace and carry the springs, and different shapes and sizes of grippers must be provided for springs which differ much from each other in diameters, lead and length, which requirement is eliminated with my improved means for transference of the springs.

My improved method of transferring the spiral springs is made adaptable by my improved method of positioning the spring after the transferring means has deposited it in a knotting location.

When the spring is to be knotted, its free end, which is to be knotted, must be properly positioned for engagement by the knotting mechanism. With my improved positioning means, the spiral spring is frictionally engaged and rotated on its axis until the free end of the end coil strikes an abutment, thus properly locating the spring for knotting. It is, therefore, immaterial in what point in the circumference of the end coil is disposed the end of the coil, as the releasable frictional rotation of the spring on its axis by the positioning means, in combination with the abutment, will properly position the spring.

The novel features of my invention are hereinafter fully described and claimed.

In the accompanying drawings, which illustrate the preferred embodiment of my invention, Fig. 1 is a longitudinal vertical sectional view, enlarged and parts omitted, of the front portion of the machine, on the plane of the line 1—1 of Fig. 4, showing the paddles in position for engagement with the cone springs on the pathway.

Fig. 2 is a side view, partly in elevation, and parts omitted, of a rear portion of the machine.

Fig. 3 is a plan view of a rear portion of the machine, with some parts omitted and others broken away.

Fig. 4 is a plan view of a front portion of the machine, some parts being omitted.

Fig. 5 is a reduced side elevation of the machine, parts being omitted, and parts broken away.

Fig. 6 is a plan view of a portion of the mechanism which drives parts of the mechanism of the machine.

Fig. 7 is a section on the line 7—7 of Fig. 6.

Fig. 9 is an inside elevation view of one of the knotting mechanisms, with the parts in the knotting positions, parts being omitted and parts being broken away.

Fig. 10 is an outer side elevation of a portion of the machine, including portions of the spinner mechanism and one of the knotting mechanisms.

Fig. 11 is a view similar to Fig. 9 of the mechanism shown in Fig. 9, showing the clutch released and the knotter head lowered.

Fig. 12 is a fragmental vertical sectional view of parts of one of the knotting mechanisms, on the plane of the line 12—12 of Fig. 9, showing the parts in the knotting position.

Fig. 13 is a view similar to Fig. 12, showing the parts of the mechanism shown in Fig. 12, on the plane of the line 13—13 of Fig. 11, showing the knotter head lowered, parts being omitted and parts broken away.

Fig. 19 is a reduced view partly diagrammatic, partly in vertical section, and partly in side elevation of the mechanism for actuating the two bars which respectively eject the cone springs from the cone spring receiving sockets, after the knotting operation.

Fig. 20 is a reduced view, partly diagrammatic, partly in elevation, and partly in vertical section of the mechanism for depressing the two stop plates, shown broken away and in solid lines in the raised position, and lowered in the dotted position.

Fig. 21 is a reduced view, partly in side elevation, partly in vertical section of a portion of the mechanism which forces the two sizing bars into engagement with the two cone springs when said springs are respectively in the two sockets of the two knotting mechanisms, and which mechanism operates the two fingers of the two knotting mechanisms.

Fig. 22 is a diagrammatic view of the circuit which includes the two solenoids and the switch, shown in side elevation in the open position, which solenoids respectively control the two clutches that respectively operate the two mechanisms for raising the two knotter heads to the knotting positions.

Fig. 23 is a side elevation of the circuit closer, shown in Fig. 22, and shown in solid lines in the open position, and in dotted lines in the closed position.

Fig. 24 is a plan view, some parts omitted, and some parts broken away, of the two spinner heads, and some of the mechanism which operates them, the spinner heads being shown in their innermost positions respectively operatively engaged with the two cone springs, disposed respectively in the two sockets of the two knotting heads.

Fig. 25 is a longitudinal, vertical sectional view, enlarged, of one of the spinner heads and a portion of the mechanism which spins it, and also a portion of the mechanism which reciprocates it.

Fig. 26 is a fragmental plan view, partly broken away, of one of the two clutch mechanisms for operating the two knotter mechanisms respectively, for raising the two knotter heads and operating the two knotting gears, shown in the release position.

Fig. 27 is a vertical section on the plane of the line 27—27 of Fig. 26, showing the parts in the positions when the clutch which controls the operation of the knotter head, is in the released position, shown in Fig. 26.

Fig. 28 is a view similar to Fig. 27, parts being broken away, and some omitted, the parts being shown in the positions occupied by them when the clutch is engaged, and the knotter head controlled thereby is raised and the knot is being made.

Fig. 29 is an enlarged side elevation, parts broken away, of one of the cone spring holding fingers, and parts cooperating therewith, the knotter head being shown lowered and the finger in the open or released position.

Fig. 30 is a view of the parts shown in Fig. 29, in side elevation, showing the knotter head raised to the knotting position and the finger in the closed position holding the cone spring in the knotting position.

Fig. 31 is an enlarged side view, partly in elevation and partly in vertical section of one of the clutch members, which carry the two clutch pins respectively, the clutch pin, shown being disposed in the position for engagement with the opposing clutch member, not shown.

Fig. 32 is an enlarged perspective view of the clutch pin shown in Fig. 31.

Similar characters of reference designate similar parts in the different views.

Figure 8:
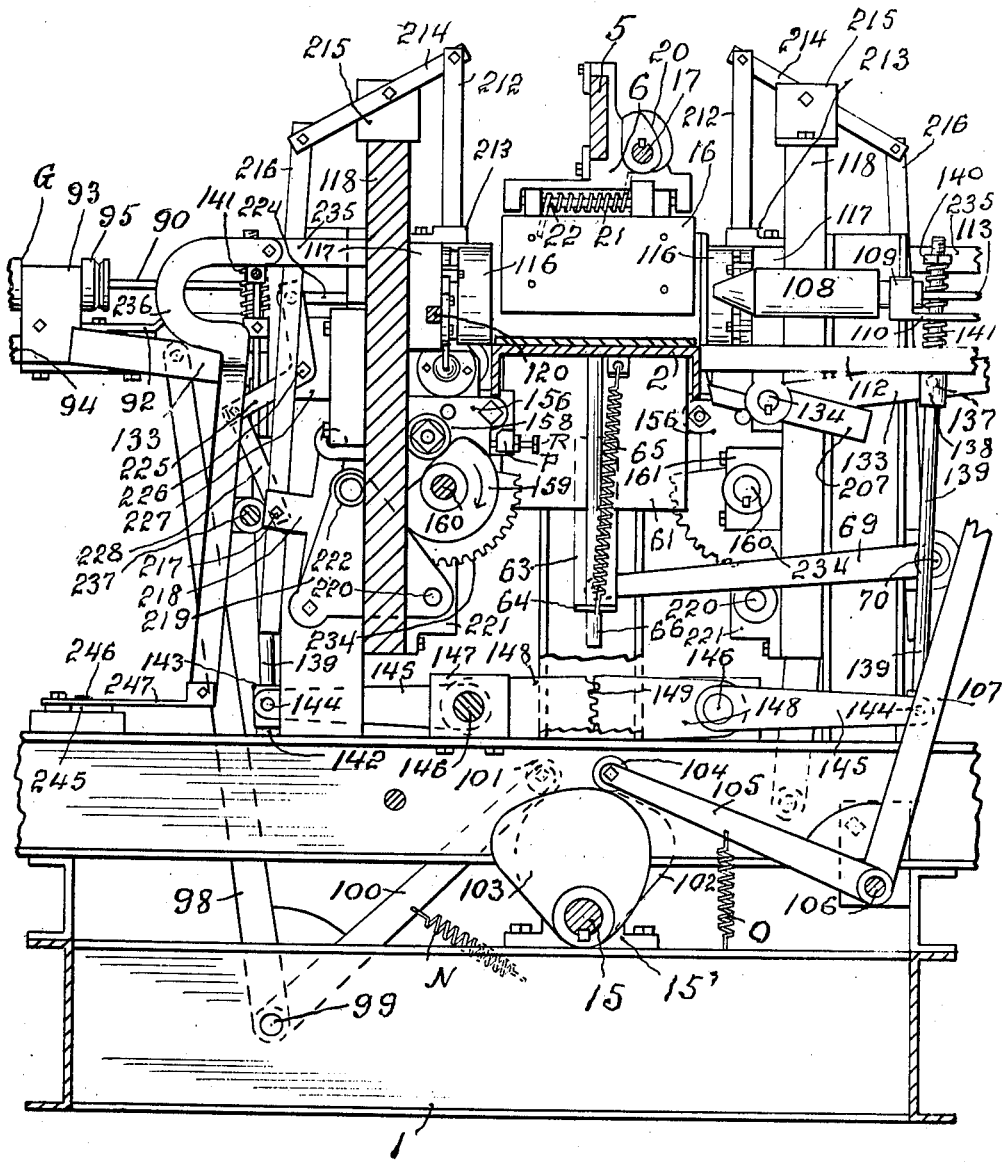
Fig. 8 is an enlarged cross section on the plane of the line 8—8 of Fig. 4, parts being omitted and parts broken away.

The machine is provided with a main frame designated by the numeral 1, in the different views. Extending centrally lengthwise and supported by the frame 1 is a supporting pathway comprising a channel 2 upon which are transferred the cone springs A, as they pass from a coiling mechanism 3, which is one of usual type and is disposed at the right end of the machine, as viewed in Fig. 1, and as viewed at the left in Figs. 4 and 5.

The spring wire B from which the cone springs A are made, is drawn from a suitable source of supply and fed into the coiler 3 where it is coiled to form a cone spring where it is severed from the wire B by a severing blade 4 of the coiler 3, Fig. 1, at which time the cone spring A is deposited upon its outer periphery in the channel 2. The cone spring A is then transferred forwardly without restraint by rolling or sliding on its periphery from its first position X in the channel 2 to two other positions Y and Z successively, Fig. 1, and eliminating the need of grippers or other accessory spring supporting means.

CONE SPRING TRANSFERRING MECHANISM

The means for transferring the con springs A along the channel 2 comprises the following described parts.

5 is a longitudinal bar supported centrally and longitudinally above the channel 2 by vertical bars 5' disposed at the ends respectively of the bar 5, and fastened to the channel 2, Fig. 5.

Slidably mounted on the bar 5 are three slide members 6 which are reciprocated by a link 7 pivoted to the upper end of an upright lever 8, pivoted at its lower end on a cross bar 9 supported on the frame 1, Figs. 1, 2, 3, 4 and 5.

A roller 10 mounted on the lever 8 engages a cam 11 fastened on a longitudinal shaft 12 rotatable at its ends in the frame 1. On the shaft 12 is fastened a gear wheel 13 meshing with a gear wheel 14 fastened on the rear end of the main driving shaft 15 disposed longitudinally on the frame 1, Figs. 1, 2, 3, 4 and 5.

*Paddle operating mechanism*

Pivoted on the slide members 6 so as to swing from the depending position, shown in solid lines in Fig. 1 and in Fig. 4, in which position they are adapted to engage and push forwardly the cone springs A from the positions X, Y and Z, to a horizontal position, shown in dotted lines in Fig. 1, are three paddles 16.

For swinging the paddles 16 from the depending position to the horizontal position, shown in dotted lines in Fig. 1, in which latter position they will clear cone springs A, the following described mechanism is provided.

A longitudinal shaft 17 is circumferentially oscillatively mounted in bearings 18 respectively provided on the slide members 6, Fig. 1. Secured on the shaft 17 are three collars 19 which respectively engage one set of ends of the bearings 18. Respectively engaging the other set of ends and rigidly secured on the shaft 17 are three cams 20 which respectively engage the upper end portions of the paddles 16. When the shaft 17 is turned in one direction they will swing the paddles 16 from the depending position to the horizontal position shown in dotted lines in Fig. 1. Three coil springs 21 respectively encircling the pivot axes 22 of the paddles 16, normally swing the paddles 16 to the depending position.

For oscillating the shaft 17, it has fastened to it one end of a longitudinal bar 23, Fig. 1, the rear end of which bar 23 extends lengthwise into a tubular shaft 24 oscillative in bearings 25 and 26 respectively mounted on the bar 5 and the travel path 2. The flat bar 23 engages and is slidable between two rollers 24' mounted in the enlarged front end of the tubular shaft 24.

Fastened to the rear end of the shaft 24 is a pinion 27 which meshes with a transverse rack 28 reciprocative in a bearing 29 on the bearing 26. To the rack bar 28 is pivoted a link 30, Fig. 2, which is pivoted to the upper end of a lever 31 carrying near its lower end a roller 32, the lever 31 being pivoted by a bolt 33 to the bearing 5', Fig. 2.

A transverse link 34 pivoted to the lower portion of the lever 31 is pivoted by a bolt 35 to the upper end of a lever 36, which is pivoted at its lower end to the frame 1. On the lever 36 near its upper end is mounted a roller 37 engaged by a cam 38 fastened on the driven shaft 12. On the shaft 12 is fastened a cam 39 which engages the roller 32 on the lever 31, Fig. 2. The levers 31 and 36 are disposed at opposite sides of the shaft 12, so that when the shaft 12 is rotated by the gears 13 and 14, driven by the main drive shaft 15, the levers 31 and 36 will be swung, by the cams 39 and 38, so as to oscillate the lever 31, and through the link 30 reciprocating the rack 28.

The rack 28 in reciprocating will, when moved in one direction, through the pinion 27, turn the tubular shaft 24, by means of the two rollers 24', in one direction, thus rotating the bar 23 and the shaft 17 to cause the cams 20 to swing the paddles 16 to the horizontal position, shown in dotted lines in Fig. 1.

When the rack 28 moves in the opposite direction, the pinion 27, shaft 24, bar 23 and shaft 17 turn and release the paddles 16 from the cams 20, after which the coil springs 21 will swing the paddles 16 to the depending position, shown in solid lines in Fig. 1.

When the main drive shaft 15 turns half a revolution, it, through the gears 13 and 14 turns the shaft 12 and the cam 11 half a turn, thus swinging the lever 8 to the right, Fig. 2, thus, through the link 7, and slide members 6, moving the shaft 17 and paddles 16 to the right to the positions shown in Fig. 1.

During the previous half turn of the drive shaft 15, the cams 38 and 39 will have caused the lever 31 to be swung, so as to operate the pinion 27, rack 28, tubular shaft 24, and bar 23 to turn the bar 17 to cause the cams 20 to swing the paddles 16 up, against the tension of the springs 21, so that the paddles 16 will clear the cone springs A which are in the locations X, Y and Z.

When the paddles in moving to the right, Fig. 1, have respectively passed these locations, or positions, the cam 11 will be positioned to permit the lever 8 to retract. At this time the mechanism, described, which turns the shaft 17, will have positioned said shaft to release the cams 20 from the paddles 16, and the springs 21 will operate to swing the paddles to the position, shown in solid lines in Fig. 1, ready for engaging the cone springs A to move the springs respectively forwardly without restraint from the locations X, Y and Z.

The retraction of the lever 8 is effected by a coil spring 40, Fig. 2, one end of which is attached to the lever 8 and the other end to a projection 40' on the frame 1.

Thus, during the rotations of the drive shaft 15, the cone springs A will each be passed by the paddles 16 consecutively, from the coiling location X to the location Y, where one end of the cone spring is knotted; then to the position Z, where the other end of the spring is knotted; and finally from the position Z, for delivery for nesting, packing or other desired purpose.

*Driving means for the main drive shaft 15*

The main drive shaft 15 is located centrally longitudinally under the supporting path of travel 2 of the cone springs A. It is rotative in bearings 15' mounted on the frame 1, as shown in Figs. 1 and 8. As shown in Fig. 1, it has keyed on it adjacent to its front or right end a spur gear 41 which meshes with a pinion 42, fastened on a longitudinal shaft 43 rotatable in bearings 47 and 48 mounted on the frame 1.

Fastened on the shaft 43 is a bevel gear 44 which meshes with a bevel gear 45, which is fastened on a transverse shaft 46, Figs. 1 and 5, rotatable on the frame 1. On the shaft 46 is also fastened, Fig. 5, a sprocket wheel 49 connected by a chain belt 50 with another sprocket wheel 51, above the sprocket wheel 49, and fastened on a transverse shaft 52 rotatably mounted on the frame 1. On the shaft 52 is fastened a pulley 53 which is connected by a belt 54 with a pulley 55, above the pulley 53, and fastened on a transverse shaft 56. On the shaft 56 are fastened two pulleys 57 and 58, to which are respectively connected two belts 59 and 60, to which are respectively connected two cone spring spinning mechanisms, to be hereinafter described.

The shaft 56 is supported in two bearings C, mounted on any suitable support, not shown. The shaft 56 may be driven by any suitable source of power, not shown, operating a belt D, partly shown, engaging a pulley E fastened on the shaft 56, Figs. 5, 6 and 7.

Cone Spring Stopping Means

The following described means are provided for successively stopping the cone spring A at the location Y, where one end of the spring is knotted; and at location Z, where the other end of the spring is knotted.

Referring to Fig. 1, 61 designates a vertically slidable stop plate mounted in a transverse slot 62 extending transversely across the bottom of the channel 2, Figs. 1, 4, 8, 10, and 24.

Fastened to the stop plate 61 is a depending bar 63 having a right angled portion 64, to which is attached the lower end of a coil spring 65, the upper end of which is attached to the channel 2. The coil spring 65 serves to normally hold the stop plate 61, elevated, as shown in Fig. 1.

A vertical bar 66 extends through a hole in the angle portion 64 of the bar 63, thus serving as a guide for the stop plate 61.

When the stop plate 61 is in the raised position, shown in Fig. 1, it will stop the progress of a cone spring A striking against it, and traveling toward the left as viewed in Fig. 1.

A vertical link 67 is pivoted at its upper end by a bolt 68 to the stop plate 61, the lower end of the link 67 is pivoted to a transverse arm 69 of a longitudinal shaft 70 rotatably mounted on the frame 1, Figs. 1, 4, 8, 10 and 20. At one end of the shaft 70 is an arm 71. At the other end of the shaft 70 is an arm 72, the function of which will be explained hereinafter.

To the arm 71 is pivoted an upright link 73, the lower end of which is pivoted to one arm 74 of a bell crank lever pivoted on a pin F, Fig. 1, mounted in the frame 1, the other arm 75 of which has at its lower end a roller 76 against which bears a cam 77 fastened on the main drive shaft 15, Figs. 1, 4 and 20.

When the drive shaft 15 rotates, the cam 77 swings the arm 75 of the bell crank lever so as to swing the arm 74 upwardly, as viewed in Figs. 1 and 20, thus swinging the arm 71 upwardly and the arm 69 downwardly to lower the stop plate 61 to the depressed position, shown in Fig. 8 and in dotted lines in Fig. 20.

*Means for stopping the cone spring in position Z*

Slidably pivoted to the arm 72, by a bolt 78, is a lateral arm 79 of a longitudinal shaft 80, shown dotted in Fig. 1, on which shaft 80 is fastened a lateral arm 81, Fig. 20, pivoted to an upright link 82, Fig. 1, pivoted by a bolt 83 to a vertical arm of an angle plate 84 fastened to a vertical stop plate 85 vertically slidable in a transverse slot 85' in the bottom of the channel 2.

The angle plate 84 has a lateral extension 86 vertically slidable on a vertical guide rod 87 depending from the channel 2. To the extension 86 is fastened the lower end of a coil spring 88, the upper end of which is attached to the channel 2, Fig. 1.

By the means just described, when the shaft 70 is rotated to force down the stop plate 61, the stop plate 85 will be forced downwardly against the tension of the coil spring 88, and when the shaft 70 is turned in the opposite direction, the coil spring 88 will force the stop plate 85 to the upper position, shown in Fig. 1, in which it will stop a cone spring A in the location Z, in which location the other end of the cone spring A will be knotted.

*Means positioning the cone spring A for knotting at one end in position Y*

When the cone spring A is stopped in the position Y, Fig. 1, it is positioned for knotting one of its free ends by a spinning mechanism comprising the following described parts.

When the cone spring A has been stopped by the stop plate 61 in the location Y, it is engaged on its inner side by a spinner head 89 which is rotatable on a horizontal transverse axis and which frictionally engages the cone spring A and forces the spring against an abutment against which it is rotated on its axis to a position in which the adjacent end of the spring A will be brought against a stop member and will then have its adjacent end coil knotted to the next coil of the cone spring A.

The spinner head 89 is cylindrical and has its front end converging and axially alined with the axis of the cone spring A in the location Y.

The spinner head, as shown in Figs. 4, 24 and 25 is fastened on the inner end of a square transverse shaft 90 which rotates the spinner head in a bearing 91 on the inner end of a transverse bar 92, the outer end of which is fastened to a bearing 93 slidable on a square transverse bar 94 mounted on the frame 1.

The transverse square shaft 90 extends through a tubular rotary clutch head G which is rotatably mounted in the bearing 93 and which has fastened on it a driven pulley 95 driven by the belt 59, already described.

Mounted in the clutch head G is a friction clutch designed to rotate the square rod 90 and the spinner head 89. The friction clutch comprises the following described parts, Fig. 25.

A clutch member H is slidably fitted on and rotatable with the rod 90. At its inner side it bears against a collar comprising a clutch member I through which the rod 90 extends and is rotatable. The clutch member I at its inner side has a frictional bearing against the clutch head G. Bearing against the outer side of the clutch member H is a collar J against which bears the inner end of a coil spring K, against the outer end of which bears the inner end of an externally threaded collar L which is adjustably fitted in the internally threaded outer end of the clutch head G. A lock nut M is fitted on the collar L and bears against the outer end of the clutch head G.

*Means for reciprocating the spinner heads*

For moving the spinner head 89, and the mechanism connected with it outwardly on the bar 94 from the operative position of the spinner head, the following described mechanism is provided.

A link 96 is pivoted at one end by a bolt 97 to the bearing 93, Figs. 4 and 24, the other end of the link being pivoted to one arm 98 of a bell crank lever, pivoted at its angle to a longitudinal shaft 99 mounted on the frame 1, Fig. 8. The other arm 100 of the bell crank lever has on it a roller 101 bearing against a cam 102, shown in dotted lines in Fig. 8, and secured on the drive shaft 15.

For swinging the bell crank lever 98—100 to move the spinner head 89 inwardly to its operative position, a coil spring N is attached at one end to the lever arm 100 and at its other end it is attached to the frame 1.

Secured on the main drive shaft 15 at a distance in the rear of the cam 102 is a cam 103, Fig. 8, which engages a roller 104 mounted on one arm 105 of a bell crank lever which is pivotally mounted on a longitudinal shaft 106 mounted on the frame 1. The other arm 107 being employed to move outwardly from its operative position another spinner head 108, which, as will afterwards be described, spins a cone spring A to its proper knotting position when the cone spring A has reached the position Z, Fig. 1.

The spinner head 108 corresponds in construction and mode of operation to spinner head 89. It is rotatable on a bearing 109, Figs. 4, 8 and 24, mounted on a transverse bar 110 fastened at its outer end to a bearing 111 slidably reciprocative on a transverse bar 112, similar to the bar 94, and fastened at its ends to the frame 1.

A square transverse shaft, or rod, 113, is fastened at its inner end to the spinner head 108, which is rotatable in a clutch head 115, Fig. 24. The clutch head 115 has mounted on it a pulley 114 engaged and driven by the belt 60, before described. The clutch head 115 is similar to the clutch head G in structure and mode of operation. It contains within it friction clutch mechanism corresponding to that shown in Fig. 25, for rotating the square rod 113 and the spinner head 108.

The spinner heads 89 and 108, as shown in Fig. 24, face in opposite directions and are respectively at opposite sides of the bar 5 over the channel 2.

Likewise the clutch heads G and 115 are respectively disposed at opposite sides of the channel 2.

To swing the bell crank lever 105—107 in a direction opposite to that in which it is swung by the cam 103, a coil spring O is attached at one end to the arm 105 and has its other end attached to the frame 1, Fig. 8. Normally the tension of the springs N and O tend to force the spinner heads 89 and 108 into the operative positions engaged with the cone springs A, as shown in Fig. 24. The cams 102 and 103 effect by the mechanisms described, the movement outwardly, simultaneously, from their operative positions, the spinner heads 89 and 108, to provide clear spaces in the locations Y and Z to receive the cone springs A which are propelled by the paddles 16 to said locations.

A link 96' pivoted to the upper end of the arm 107, is pivoted by a bolt 97' to the bearing 111, similar to the bearing 93.

The Knotting Mechanisms

There are two knotting mechanisms, respectively located at the locations Y and Z at opposite sides of the channel 2 and respectively alined with the spinner heads 89 and 108, Fig. 24.

The two knotting mechanisms are alike with respect to construction and mode of operation, so that a description of one will suffice for each.

The knotting mechanism which will be particularly described will be the one directly opposite location Y. The spinner head 89 when operatively engaged with a cone spring A will force the latter into a substantially elliptical socket 116 fastened on to two plates 117 fastened to a large rectangular vertical plate 118, fastened to the frame 1, and adapted to support the adjacent knotting mechanism, which makes the first knot on one end of the cone spring A, when the cone spring A has been forced by the spinner head 89 into the socket 116. The socket 116 is composed of two spaced apart members respectively fastened at their outer edges to the two plates 117, Figs. 4, 9, 11, 14, 15 and 24.

Figure 14:
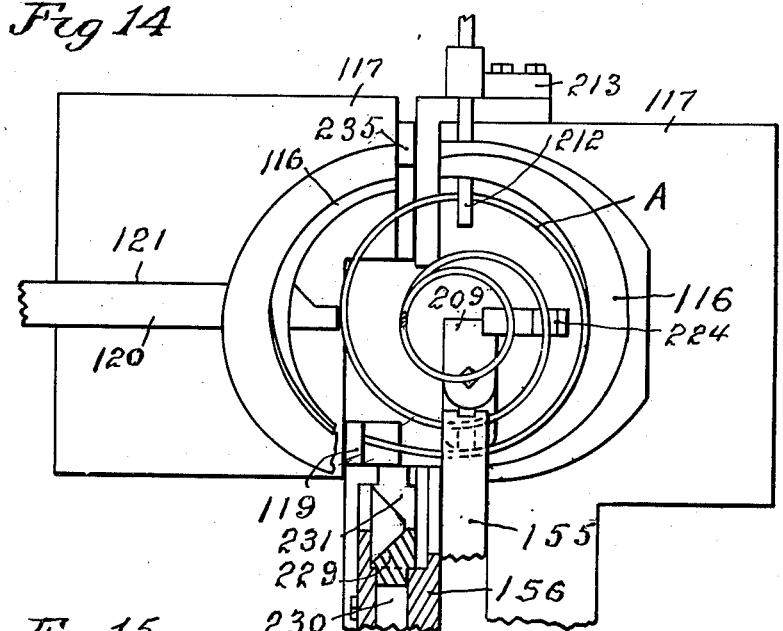
Fig. 14 is an enlarged inner side elevation of one of the cone spring receiving sockets, showing the cone spring positioned therein, and held by the finger, a portion of the knotter head and the knotting gear, being shown in vertical section, and in the lowered position.

When the spinner head 89 forces the cone spring A into the socket 116 and against the plates 117 at the rear end of the socket, Fig. 24, the spinner head 89 will rotate by friction the cone spring A in a clockwise direction, as viewed in Figs. 14 and 24, until the adjacent free end of the cone spring A will be brought against a stop abutment 119, Fig. 14, which abutment will hold the cone spring A from further rotation, at which time the frictional clutch in the clutch head G will slip and the spinner head 89 will temporarily stop from rotating.

Before knotting, the cone spring A is held firmly in position and is sized in diameter at the adjacent end of the cone spring A, this being effected by a slidable horizontal bar 120, Figs. 9, 11, 14 and 15, slidable in a groove 121 in the left plate 117. The bar 120 passes through an opening in the adjacent side of the socket 116 and engages the outer periphery of the adjacent end coil of the cone spring A and forces the portion of the coil which is engaged by the bar 120, toward the opposite portion of the socket 116, thereby forcing the diametrically opposite portion of the end coil tightly against said opposite portion of the socket 116, as viewed in Fig. 14. This compression of the cone spring A by the bar 120, properly sizes the end coil so compressed.

The bar 120 is forced inwardly by a transverse bar 122, Figs. 4, 9 and 11, pivoted to the bar 120 and pivoted at its other end to an angle plate 123 fastened to another angle plate 124 which is fastened to the frame 1, Fig. 4.

Between its pivot points, the bar 122 has an upward projection 125, in which is slidably and loosely mounted a longitudinal rod 126, at the outer side of the adjacent plate 118. A coil spring 127 encircles the rod 126, and bears at one end against the projection 125, and against a nut 128 on the rod 126.

The rod 126 is pulled against the tension of the coil spring 127 by the upper end of a lever 129, Figs. 4 and 10, pivoted to the rod 126, and pivoted below the rod to the frame 1 by a bolt 130, Fig. 10.

The lever 129 has fastened to it below the bolt 130, a lug 131 engaged by a projection 132 on a lever 133, Fig. 10, which lever 133 pivots on a longitudinal shaft 134, Figs. 9 and 11, oscillative in a bearing 135 on the inner side of the supporting plate 118.

When the lever 133 is swung, as will later be described, to bring the projection 132 against the lug 131 on the lever 129, the latter will be moved at its upper end to the left, as viewed in Fig. 10, thus moving the rod 126 to the left, as viewed in Fig. 10, and to the right, as viewed in Fig. 9, thus causing the coil spring 127 on the rod 126, to push against the projection 125 so as to swing the bar 122 so that it pushes the slidable sizing bar 120 into the socket 116, Figs. 14 and 15, engaging the inner end of the sizing bar 120 with the outer coil of the cone spring A, thus sizing said coil in diameter.

Means for swinging the lever 133

The lever 133 is shown in end elevation in Fig. 10 and in plan view in Fig. 4, and in side elevation, broken away, in Fig. 8. In Fig. 4, the two levers 133 of the two knotting mechanisms, are both shown at opposite sides of the channel 2.

The lever 133 has a hole into which extends a pin 137 mounted on a sleeve 138 slidable on a vertical rod 139, which has at its upper end a nut 140 against which bears the upper end of a coil spring 141, the lower end of which bears against the upper end of the sleeve 138, Figs. 8 and 10.

The lower end of the rod 139 has a nut 142 bearing against the lower end of another sleeve 143 having a lateral pin 144 engaging a lever 145 fastened to a longitudinal oscillative shaft 146 mounted in bearings 147 on the frame 1, Figs. 8 and 10.

Fastened to and oscillative with the shaft 146 is a lateral arm 148 having an arcuate row of teeth 149 meshing with the arcuate row of teeth 149 on the lateral arm 148 of the other knotting mechanism, and which operates the sizing bar 120 of the other knotting mechanism, which knots the opposite end of the cone spring A, when the latter is positioned at the location Z, Figs. 8, 10 and 21.

For simultaneously operating the mechanisms that operate the two sizing bars 120, one of the shafts 146 has fastened to it a lateral arm 151 having on it a roller 152, Figs. 1 and 21, against which bears a cam 153 fastened on the driving shaft 15.

A coil spring 133' is attached at one end to the lever 133 and at its other end to the adjacent plate 118, which spring serves to retract the lever 133 and the mechanism which connects it with the operating cam 153, after the cam has released the arm 151, Figs. 5 and 10.

Attached to the sizing bar 120 is one end of a coil spring 154, the other end of which is attached to the channel 2. The tension of the spring 154 withdraws the sizing bar 120 from the innermost position. It also retracts the bar 122 and the mechanism operated by it Figs. 4, 5, 9 and 10.

During the rotation of the main drive shaft 15, the cam 153 at the proper time will swing the arm 151, thereby turning the shaft 146, to which the arm 151 is attached, so as to swing the two intermeshing arms 148, so as to move down the two bars 139 and with said bars the sleeves 138, against the tension of the springs 141.

The sleeves 138 will swing the levers 133, so that the projections 132 thereon will engage the two lugs 131 on the levers 129. The levers 129 will be moved so as to draw the rods 126, causing the springs 127 to push the projections 125 and the levers 122 laterally, so as to force the two sizing bars 120 inwardly to size the two cone springs A, which at the time are respectively in the sockets 116.

When the cam 153 is turned to release the arm 151, the coil springs 133' will retract the levers 133 and the movable parts connected therewith. At the same time the two springs 154 will retract the two sizing bars 120, the rods 126 and the levers 129 to their initial positions, shown in Fig. 10.

*The spring holding fingers*

Each knotting mechanism has a finger 155 for firmly holding the cone springs A in the adjacent socket 116 in position for knotting, Figs. 9, 11, 14 and 15. The mechanism for operating the finger 155 will be explained hereinafter. The finger is shown in holding position in Figs. 9, 14 and 15, and in the release position in Fig. 11.

THE KNOTTER HEADS

Each knotting mechanism has a knotter head 156, which is vertically slidable in a vertical slot 157 in the adjacent plate 118, Figs. 12 and 13. Each before named stop abutment 119 is mounted on top of the adjacent knotter head 156, and is in operative position when the knotter head is in the lowered position, shown in Figs. 13 and 14.

*Means for raising the knotter heads*

For raising the knotter head 156, it has mounted on it a roller 158 which bears at its lower side on the cam 159 fastened on a longitudinal shaft 160, mounted in bearings 161, Figs. 9, 11, 12 and 13, said bearings 161 being mounted on the inner side of the adjacent plate 118.

On the shaft 160 is fastened a brake hub 162 against which normally bears with yielding pressure, a brake band 163 fastened to the supporting plate 118, Figs. 9 and 11.

*Clutch mechanism for rotating shaft 160*

Fastened on the shaft 160, Figs. 9 and 11, is a clutch member 164 through which extends and is slidable, a clutch pin 165, having at its right end, as viewed in Figs. 9 and 11, a head 166 provided with an angular surface 167 adapted to be releasably engaged by an oscillative bar 168, for withdrawing the pin 165 from engagement with any one of four clutch pins 169 mounted in a circle around the shaft 160, on the adjacent end of the other clutch member 170, rotatable on the shaft 160.

The clutch member 170 has attached to it a sprocket wheel 171 engaged by a sprocket chain 172, Figs. 4, 5, 9 and 11, which sprocket chain 172 engages a sprocket wheel 173 fastened on a longitudinal shaft 174 mounted in bearings 175 on the frame 1, Figs. 4 and 5.

A pulley 176 fastened on the shaft 174 is connected by a belt 177 to a driving pulley 178 mounted on the armature shaft of an electric motor 179 mounted on the frame 1. An idle pulley 180 is rotatable on the shaft 174, onto which idle pulley the belt 177 may be shifted, when it is desired to not rotate the shaft 174.

*Means for releasably engaging clutch pin 165 with the clutch pins 169*

A spring 181 bears against the clutch member 164, at one end, which member 164 has a longitudinal slot 182 through which the spring 181 extends into a hole through the clutch pin 165. The tension of the spring 181 normally tends to force the clutch pin 165 into operative engagement with the pins 169, as shown in Fig. 9. See also Fig. 31. 165' designates the hole through the pin 165.

For retracting the clutch pin 165 from its engaging position, the angular surface 167 of the head 166 of the clutch pin 165 engages the bar 168, when the latter is in its engaging position, shown in Figs. 26 and 27. The lower end of the bar 168 pivots on a longitudinal bar 183 fastened to the frame 1. Figs. 9, 11, 27 and 28.

The bar 168 has near its upper end a projecting arm 184 adapted to be engaged by a flat bar 185, pivoted below the arm 184, by a bolt 186 to one flange 187 of an angle bar, said flange being cut away at its upper end portion. The other flange 188 of the angle bar extends upwardly and is pivoted to a link 189 pivoted to a horizontal transverse core 190 of a solenoid 191 mounted on the angle plate 124, fastened to the frame 1, Figs. 9, 11, 26 and 27.

When the bar 185 engages the arm 184, as shown in Fig. 26, it is held in such engagement by having its lower pointed end engaged with the upper left beveled edge of a vertically slidable member 193, carrying two bolts 194, which are vertically slidable in a vertical slot 195 in the flange 187. A coil spring 196 has its lower end secured to the upper bolt 194, its upper end being secured to the bolt 186, which spring 196 normally tends to pull the member 193 to the upper holding position.

The clutch member 164 has at one end a peripheral arm 197 on which is a cam 198 which engages a lateral pin 199 on the upper end portion of the bar 185, and swings the bar from the engaged position shown in Figs. 11, 26 and 27, to the idle position shown in Fig. 9, in which it strikes a projection 200 on the flange 187, Fig. 9.

For resetting the bar 185 to its operative position for engaging the arm 184 on the oscillating bar 168, the other end of the clutch member 164, at the side opposite the arm 197, has a peripheral arm 201 having on it a cam 202, which engages the pin 199 and swings the bar 185 back into engagement with the arm 184.

It will be noted that the upper end of the bar 168 has a lateral projection 168', which is the portion which engages the beveled portion 167 of the clutch pin head 166, and withdraws the clutch pin 165 from engagement with the pins 169, Figs. 9, 11, 27 and 28.

The lower end of the flange 187 of the angle bar 187—188 is rigidly fastened to a collar 187' pivoted on the bar 183.

When the solenoid 191 is energized, it will draw into it the core 190, thereby, through the link 189, angle bar 187—188, bar 185, arm 184 and bar 168, swinging the bar 168 to draw the projection 168' thereof, from engagement with the head 166 of the clutch pin 165, thus permitting the spring 181 to force the pin 165 into position for engagement with one of the clutch pins 169, thereby revolving the clutch member 164 and shaft 160.

A coil spring 192 fastened to the frame 1 and to the bar 168 normally swings the bar 168 into position for its next engagement with the head 166 of the pin 165.

The revolving of the clutch member 164 causes the cam 198 to engage the pin 199 of the bar 185, thereby swinging the bar 185 to the position shown in Fig. 9, whereby it is held in that position by the spring 196, in which position it is disengaged from the arm 184 of the bar 168, upon which the spring 192 will swing the bar 168 again into position for reengagement with the clutch pin head 166.

The continued revolution of the clutch head 164 will bring the cam 202 into engagement with the pin 199, thereby swinging bar 185 again into position, shown in Fig. 11, in which the bar 185 will again be in the path of the arm 184 of the bar 168, as shown in Fig. 26.

The bar 185 being pivoted to the flange 187 of the angle bar 187—188 has two movements, one being with the bolt 186 as an axis and the other being in a plane at right angles thereto on the axis of the bar 183, to which bar 183, the flange 187 is pivoted by the collar 187', Fig. 11.

For swinging the angle bar 187—188 to the left, Fig. 27, when the solenoid 191 is deenergized, thus releasing the core 190, there is provided a compression coil spring 188', which encircles a rod 189' having one end bifurcated and pivoted to the flange 188. The other end of the rod 189' is slidably mounted in a hole provided in a plate 190', supported by the angle plate 124.

*Means for actuating the cone spring holding fingers*

In each knotting mechanism the following described mechanism is provided for actuating the finger which holds the cone spring A in the proper position for being knotted.

The finger 155 has rigidly fastened to it one end of a bolt 155' which extends laterally through a depending portion of one of the plates 117, and which is oscillative therein to permit the finger 155 being swung to and from the cone spring holding position, Fig. 9.

Figure 15:
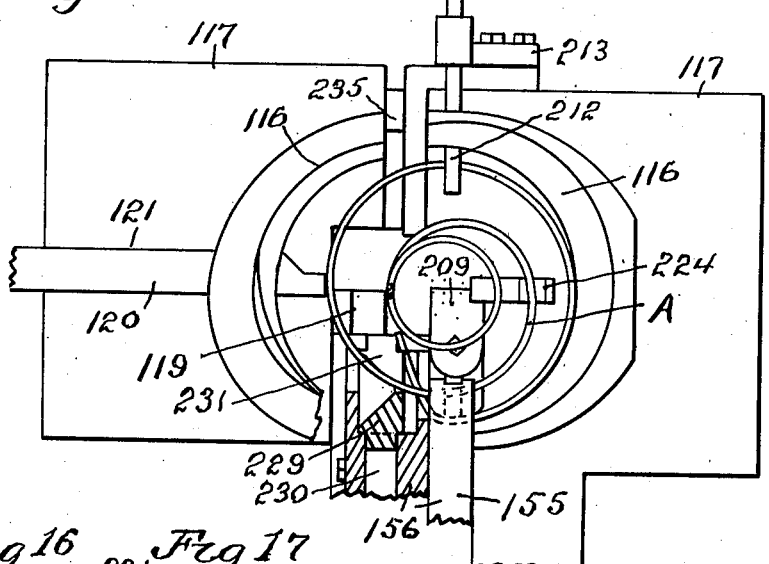
Fig. 15 is a view similar to Fig. 14, showing the same parts as in Fig. 14, the knotter head being shown raised, and the knotting gear engaged with and having bent the end portion of the end coil of the cone spring, and just prior to the completion of the knot.
Figures 16, 17, 18:
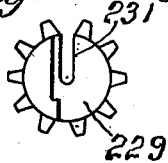
Fig. 16 is an end elevation of the knotting gear of one of the two knotting mechanisms.
Fig. 17 an elevation view of the other end of said knotting gear.
Fig. 18 a side elevation of the gear.

For swinging the finger 155 from its raised open position, shown in Figs. 11 and 29, to the closed holding position, shown in Figs. 9, 14 and 15, the finger has on it a lateral pin 204, which extends into a slot 205 in one end of an L shaped member 206, which is fastened on one end of the shaft 134, on which the lever 133 is pivoted, Figs. 9 and 11.

Fastened to the other end of the shaft 134 is an L shaped arm 207 located in the path of the lever 133 as the latter is swung to locate the sizing bar 126. When the lever 133 so swings, it swings the L shaped member 207 so as to rotate the shaft 134 and with it the L shaped member 206 to swing the finger 155 to the holding position shown in Figs. 9, 14 and 30.

A coil spring 208, Fig. 10, is attached at one end to the arm 207 and to one side of the channel 2. The tension of the spring 208 normally retracts the arm 207, shaft 134, L shaped member 206 and finger 155 to the positions shown in Fig. 11 and Fig. 29.

*How the finger holds the cone spring A*

Fastened on the inner side of the adjacent plate 117, in the socket 116 is an L shaped block 209 having a vertical rib 210, Figs. 11, 14, 15 and 29, which rib is cut through by an arcuate groove 211 into which the coil next to the positioned end coil of the cone spring A is disposed, and held by the finger 155. The free end of the outer coil of the cone spring A rests against the lower arcuate edge of the block 209, Figs. 14 and 15.

At the time the knotter head 156 is rising, a vertical bar 212 slidably mounted in a bearing 213, mounted on one of the plates 117, moves downwardly from the position shown in Figs. 8 and 11, to the lower position, shown in Figs. 14 and 15, at the inner side of the adjacent end coil of the cone spring A, thereby holding the cone spring A from tilting when the knot is being formed between the free positioned end coil and the coil next thereto of the cone spring A.

*Means for reciprocating the bar 212*

Pivoted to the upper end of the bar 212 is one end of a lever 214 pivoted to an angle plate 215 fastened to the upper end of the adjacent plate 118. The lever 214 has fastened to its other end, Fig. 8, the upper end of a link 216, the lower end of which is pivoted to a bolt 217 mounted in another link 218, Figs. 8, 10, 12 and 13.

The link 218 has its upper end pivoted to the knotter head 156, its lower end being pivoted to one corner of a triangular plate 219 fastened on and oscillative with a short shaft 220 mounted in a bearing 221 fastened to the plate 118, Figs. 9, 11, 12 and 13.

The triangular plate 219 has on one of its corners a roller 222, which engages a cam projection 223 on one side of the cam 159, which is rotated by the shaft 160, Figs. 11, 12 and 13. When the shaft 160 turns the cam 159 to raise the knotter head 156, through the mechanism just described, the bar 212 will be lowered. When the cam 159 is finishing its revolution, its projection 223 operating on the roller 222, will retract the triangular plate 219, thus, through the link 218, bolt 217, link 216 and lever 214 forcing the bar 212 upwardly to its initial position, shown in Figs. 8 and 11.

Setting the second coil of the cone spring A

In order that the end coil of the cone spring A, after the knotting operation, shall be at right angles to the axis of the cone spring A, the second coil of the cone spring A is punched to set it, by the following described means.

The inner end of a bar 224 is reciprocative through a slot extending through one of the plates 117 and the plate 118. Said inner end of the bar 224, when the bar is forced inwardly, engages the second coil of the cone spring A and forces it inwardly, while the coil is being held by the finger 155 and the L shaped member 209, thus imparting a set to said second coil, Figs. 14 and 15.

The setting of the second coil of the cone spring A will, after the knotting is done, cause that end of the cone spring A to be perpendicular to the axis of the cone spring A, whereby the cone spring A will stand upright when resting on that end.

To force the bar 224 inwardly, to set the second coil, the outer end of the bar 224 is pivoted to the upper end of a lever 225, pivoted by a bolt 226 to a bearing 227 fastened to the outer side of the adjacent plate 118, Figs. 4, 8, 10, 14 and 15.

The lever 225 is angular and has its lower end pivoted to a link 228 which is pivoted to the bolt 217, mounted on the link 218, which link 218 and the mechanism just described, which moves the link, causes the bar 224 to be forced inwardly when the link 218 raises with the knotter head 156.

When the knotter head 156, and with it the link 218, lowers, the bar 224 will be retracted outwardly by means of the link 218, bolt 217, link 228 and the lever 225.

Forming the knot

Referring to Figs. 12 to 18, for bending the free positioned end of the end coil of the cone spring A across the second coil and knotting the end coil, the following described mechanism is employed.

A spur gear wheel 229 is rotatably mounted on its end hubs in opposite side walls of a vertical slot 230, which extends vertically through the knotter head 156. The gear wheel 229, which is the knotting gear, has a radial slot 231, which normally extends upwardly, as shown in Fig. 13, and which is rotated by an intermediate gear 232 rotatable on a stub shaft 233 in the slot 230, below the gear 229.

For rotating the intermediate gear wheel 232, there is fastened on the shaft 160 a segmental gear 234 which meshes with the gear 232.

As the knotter head 156 is raising, the second coil of the cone spring A will enter the slot 231 in the knotting gear 229, and the free end of the outer coil will be engaged by the periphery of the knotting gear 229, which will bend the free end portion of the end coil across the second coil, which in the mean time enters the slot 231 and passes to the axis of the knotter gear 229.

After the second coil of the cone spring A has passed to the axis of the knotter gear 229, the segmental gear 234 has become engaged with the intermediate gear wheel 232, and rotates the latter and with it the knotting gear 229, whereby the free end of the outer coil is wound around the second coil, thus completing the knot.

As the knotter head 156 rises, an L shaped pressure lever P pivoted on the head 156 by a bolt Q, Fig. 9, engages the inner side of the finger 155 and holds the finger firmly in its holding position, while the knot is being formed. An adjusting screw R, Figs. 8, 9, 11, 12, 13 and 29, exends through a threaded hole in the lever P and rests against the knotter head 156. By adjusting the screw R the pressure of the lever P upon the finger 155 may be varied.

When the clutch member 164 is engaged with and rotated by the continuously rotating clutch member 170, the shaft 160 will be rotated and with it the cam 159, which engages the roller 158 and raises the knotter head 156. At the same time the segmental gear wheel 234 will be rotated, and through the intermediate gear 232 will rotate the knotting gear 229, to form the knot.

When the shaft 160 continues its rotation after the knot has been formed, the cam 223 engages the roller 222, thereby swinging the triangular plate 219, from the position shown in Fig. 12 to the lowered position shown in Fig. 13. The downward swinging of the triangular plate 219 will through the link 218 lower the knotter head 156, to the positions shown in Figs. 9 and 13, thereby releasing the cone spring A from the knotter gear 229.

As the knotter head 156 moves downwardly, the finger 155 is swung inwardly to release the cone spring A by means of the spring 208, and the bar 212 is withdrawn from the cone spring A holding position, shown in Fig. 14 to the position shown in Fig. 11, by the cam 223 swinging the triangular plate 219, thereby causing the links 218 and 216 to swing the lever 214 to the position shown in Fig. 8 and Fig. 11, thereby withdrawing the bar 212.

Means for removing the knotted cone spring A from the socket 116

For ejecting the knotted spring from the socket 116 in the location Y, there is provided a transverse bar 235, which is reciprocative in a slot in the adjacent plate 118, Figs. 12 and 13.

The bar 235 is positioned so that its inner end is in engagement with the knotted end of the cone spring A, and as the bar is moved inwardly, it pushes the released knotted cone spring A out of the socket 116 into the path of travel of the second paddle 16, which pushes the cone spring A with one end knotted, into the position or location Z.

The bar 235 in ejecting the knotted cone spring A, passes between the two halves of the socket 116, and between the two plates 117 to the position shown in Fig. 13.

For forcing the bar 235 inwardly to eject the cone spring A after the first knotting operation, in location Y, the outer end of the bar 235 has pivoted to it the upper end of a lever 236 which extends downwardly, Figs. 12 and 13, from the bar 235, and is pivoted midway of its length on a longitudinal bar 237 having its ends mounted in bearings 238 on the main frame 1. The lower end of the lever 236 is pivoted to one end of a transverse link 239, Figs. 4 and 19.

The other end of the link 239 is pivoted to the upper end of a lever 240, the lower end of which is pivoted by a bolt 241 to the frame 1.

Between its ends the lever 240 has rotatable on it a roller 242 which engages a cam 243 fastened on the driving shaft 15, Fig. 19.

A coil spring 244 has one end fastened to the lever 240, its other end being fastened to the frame 1, the tension of the spring holding the roller 242 against the cam 243, and also serving to force the ejecting bar 235 inwardly to push the knotted spring out of the socket 116, Fig. 13. The cam 243 in rotating swings the lever 240 in the opposite direction, thus retracting the bar 235 to its outer position, Fig. 12.

*Positioning the cone spring A for knotting its other end*

After one end of the cone spring A has been knotted and the cone spring A has been passed into position or location Z for positioning, preparatory to knotting the other end of the cone spring A, the other positioning mechanism, which corresponds to that already described, is operated in a similar manner.

After the cone spring A has been positioned, the sizing, setting, knotting and ejecting mechanisms are operated, as already described, by similar mechanisms alike in construction and mode of operation to the corresponding mechanisms respectively hereinbefore described.

The only difference being in location, as the two sockets 116 are at opposite sides of the channel 2, and in the connections between the lever 240 and the two cone spring ejecting mechanisms. These differences will now be described.

*Differences between the two ejecting mechanisms*

Referring to Figs. 4 and 19, the only difference between the ejecting mechanism which is opposite location Y, and that opposite location Z, is that the link 239 of the last named mechanism, is pivoted, at the end opposite that pivoted to the lever 240, to one end of a longitudinal lever 245, Figs. 4 and 19.

The lever 245 is pivoted to the main frame 1 by a vertical bolt 246, the other end of the lever 245 being pivoted to one end of a transverse link 247, the other end of which is pivoted to the lower end of the other lever 238.

With both ejecting mechanisms, the sockets 116 face in opposite directions, and the connections of the ejecting mechanisms with the lever 240 are reversed, so that when the cam 243 swings the lever 240 in one direction, the ejecting bars 235 will be retracted to their outer positions, and when the lever 240 is swung in the opposite direction by the coiled spring 244, the ejecting bars 235 will be forced inwardly to their ejecting positions.

*Solenoid circuit controlling mechanism*

Referring to Fig. 23, 248 designates a switch lever pivoted at one end to a bearing 249 mounted on the frame 1, the other end portion of the lever 248 carrying, and having insulated from it an electrical contact member 250, which is adapted to make contact and connect two electrical contact members 251 and 252, when the lever 248 is swung to the position shown in dotted lines.

The two contact members 251 and 252 are mounted upon but insulated from the frame 1. They are also insulated from each other.

For normally supporting the lever 248 in the elevated position, shown in Fig. 23, in solid lines, with the contact member 250 separated from the contact members 251 and 252, the lever 248 has mounted on it a roller 253, which rests upon a cam 254 fastened on the main drive shaft 15.

During each revolution of the main drive shaft 15, the cam 254 permits the lever 248 to lower to the dotted position, shown in Fig. 23, in which position the contact member 250 will electrically connect the contact members 251 and 252.

Referring to Fig. 22, which is a diagrammatic view of the electrical circuit, which includes the solenoid coils 191, and the contact members 251 and 252, 255 and 256 respectively designate the positive and negative conductors of an electrical supply system, the source of electrical supply thereto not being shown.

The electrical circuit shown is of the D. C. type. If it is desired to use the A. C. type current, the conductors 255 and 256 would be connected, in the usual manner, to a transformer, not shown.

An electrical conductor 257 connects the conductor 255 with the contact member 251. A conductor 258 connects the contact member 252 with one terminal of the left hand solenoid coil 191, the other terminal of the coil being connected by a conductor 259 with the conductor 256.

A conductor 260 connects the conductor 258 with one terminal of the right hand solenoid coil 191, the other terminal thereof being connected by a conductor 261 with the conductor 256.

When the lever 248 lowers to the position, shown in dotted lines in Fig. 23, in which position the contact member 250 will be electrically engaged with the contact members 251 and 252, the current will pass from the positive conductor 255 through the conductor 257, contact member 251, contact member 250 and contact member 252 into the conductor 258, where the current will divide, part of it passing through the conductor 258, solenoid coil 191, at the right, and thence through the conductor 259 to the next conductor 256. The other portion of the current will pass from the conductor 258 through the conductor 260, left hand solenoid coil 191 and conductor 261 to the negative conductor 256.

The solenoid coils 191 will thus be energized and will respectively draw into them the cores 190, thereby actuating the two mechanisms, already described, for drivingly engaging the two clutch members 164 with the two clutch members 170.

The main drive shaft 15 in revolving rotates the cam 254 so as to raise the lever 248 for separating the contact member 250 from the contact members 251 and 252, thereby opening the electric circuit, in which the solenoid coils 191 are located.

A portion of the solenoid circuit controlling mechanism is shown in Fig. 1.

SUMMARY

It has been described hereinbefore how a spiral spring A, of the double cone type, has been coiled in the coiler 3, severed from the wire supply source B and then deposited in the location X in the path of the first paddle 16, then propelled by said first paddle 16 into the location Y, where it is stopped by the stop plate 61; then positioned by the first spinning mechanism in the first socket 116, in which one end coil of the cone spring A was knotted and then ejected from the socket 116 and replaced, while retaining its endwise position, onto the channel pathway 2, at the location Y, where the cone spring A was engaged by the second paddle 16 and propelled into the location Z, where it is stopped by the stop plate 85; then positioned by the second spinning mechanism in the second socket 116, where the other end coil of the spring A is knotted, and the spring, with both ends now knotted, is replaced on the pathway channel 2 in location Z.

The stop plate 85 is then lowered by the mechanism described, and the third paddle 16 engages and propels the knotted cone spring A from the location Z further along the pathway 2 from which it is removed for packing or storing.

Each pair of plates 117 of the two knotting mechanisms, constitutes an outer abutment against which the adjacent spinner head, 89 or 108, as the case may be, pushes and compresses the spiral spring A and revolves it, with its adjacent free end leading, until said free end strikes an inner abutment constituting the stop plate 119 mounted upon the adjacent knotter head 156, at the inner sides of the adjacent plates 117.

The pathway for supporting spiral springs in their travel from the coiling means 3 at location X, to and from the locations Y and Z, may be of any desired form or construction such as will support the springs as they roll or slide on their peripheries.

With spiral springs of the double cone type having end coils of similar diameters, the channel form pathway 2 having a flat bottom is adapted for this function.

The main shaft 15 controls the operation in proper sequence of the spring transferring mechanism, the spring positioning, sizing, setting, knotting and ejecting mechanisms, by which the various mechanisms perform their respective functions in the proper order. This control by the main shaft, is effected by means of the cams mounted on the main shaft 15, which cams are respectively included in said mechanisms, as hereinbefore described, said cams having the shapes and relative arrangements on the main shaft 15 required to properly effect their functions at the proper times.

Various modifications of my invention, within the scope of the appended claims, may be made without departing from the spirit of my invention.

What I claim is:

1. In the making of a spiral spring, the method consisting in coiling wire to form a spiral spring with free end coils, depositing the coiled spring on its outer periphery at a location on a supporting pathway, causing the spring to travel forwardly without restraint supported on its periphery on the pathway from said location to a second location on the pathway, at said second location turning the spring on its axis by slipping frictional engagement therewith to bring the free end of one of the end coils against an abutment for positioning said end coil for knotting, and then knotting said positioned end coil.

2. In the making of a spiral spring, the method consisting in coiling a wire to form a spiral spring with free end coils, depositing the coiled spring on its outer periphery at a location on a supporting pathway, causing the spring to travel forwardly without restraint supported on its periphery on the pathway to a second location on the pathway, at said second location moving the spring endwise in one direction to a knotting position, turning the spring on its axis to bring the free end of the advanced end coil against an abutment for positioning said coil for knotting, and then knotting said coil.

3. In the making of a spiral spring, the method consisting in coiling a wire to form a spiral spring with free end coils, depositing the coiled spring on its outer periphery at a location on a supporting pathway, causing the spring to travel forwardly without restraint supported on its periphery on the pathway to a second location on the pathway, at the second location positioning the spring for knotting one end coil thereof, knotting said end coil, redepositing the spring on the pathway, causing the spring to travel similarly supported on the pathway to a third location, at said third location positioning the spring for knotting the other end coil, and then knotting the last named coil.

4. In the making of a spiral spring, the method consisting in transferring a spiral spring with free end coils from one location in a path of travel to a second location, at said second location moving said spring endwise in one direction transverse to the line of travel to a knotting position at one side of the path of travel, knotting one end coil of the spring at said knotting position, then transferring the spring to a third location spaced longitudinally apart along the line of travel from said second location, at said third location moving said spring endwise in a direction opposite to the first named direction to a knotting position at the other side of the path of travel, then knotting the other end coil in the last named knotting position.

5. In the making of a spiral spring, the method consisting in depositing a spiral spring with free end coils at a location on a supporting pathway, causing the spring to travel supported on its periphery on the pathway to a second location on the pathway, at the second location moving the spring endwise in one direction transverse to the pathway to a knotting position at one side of the pathway, knotting one end coil of the spring at said knotting position, replacing the spring on the pathway while retaining it in the same endwise position, causing the spring to travel supported on its periphery on the pathway to a third location spaced longitudinally along the pathway from the second location, at said third location moving the spring endwise in a direction opposite to the first named direction to a knotting position at the other side of the pathway, then knotting the other end coil in the last named knotting position.

6. In the making of a spiral spring, the method consisting in disposing a spiral spring, having free end coils, in one location, frictionally engaging the spring and turning it on its axis in a direction in which the free end of one end coil leads and until said free end strikes an abutment located in the orbit of said free end, then knotting said free end coil, transferring the spring to another location while retaining it in the same endwise position, frictionally engaging the spring and turning it on its axis in a direction opposite to the first named direction, until the free end of the other end coil strikes an abutment located in the orbit of the last named free end.

7. In an apparatus of the kind described, in combination, a pathway having means for supporting a spiral spring, having an end coil with a free end, on the outer periphery of the spring so that the spring can roll on its periphery on said pathway, means including a pushing member adapted for travel parallel with said pathway, for engaging the rear side of said spring and pushing the spring from one location on said pathway to a second location thereon, means at said second location for positioning the spring for the knotting of said free end coil, and means for then knotting said free end coil.

8. In an apparatus of the kind described, in combination, a pathway having means for supporting a spiral spring, having an end coil with a free end, on the outer periphery of the spring so that the spring can travel forwardly without restraint on its periphery on said pathway, means including a pushing member adapted for oscillation parallel with said pathway, for engaging the rear side of said spring, when moving in one direction, and pushing the spring from one location on said pathway to a second location thereon, means at said second location for positioning the spring for the knotting of said free end coil, and means for then knotting said free end coil.

9. In an apparatus of the kind described, in combination, a pathway having means for supporting a spiral spring, having free end coils, on the outer periphery of the spring so that the spring can travel forwardly without restraint on its periphery on said pathway from a first location thereon to a second location and a third location, spaced from each other and from said first location longitudinally along said pathway, means for moving the spiral spring, so supported, from said first location to said second location, and then to said third location, means at said second location for positioning the spring for the knotting of one free end coil of the spring, means at said second location for knotting said one free end coil, means at said third location for positioning the spring for the knotting of the other free end coil, and means at said third location for knotting said other free end coil.

10. In an apparatus of the kind described, in combination, a pathway having means for supporting a spiral spring, having free end coils, on the outer periphery of the spring so that the spring can roll on its periphery on said pathway from a first location to a second location and a third location thereon, spaced from each other and from said first location longitudinally along said pathway, means for moving the spiral spring, so supported, from said first location to said second location, and then to said third location, means at said second location at one side of said pathway for knotting one free end coil of the spring, means at said second location for positioning the spring for the knotting of said one free end coil, means at the third location at the other side of said pathway for knotting the other free end coil, and means at said third location for positioning the spring for the knotting of said other free end coil.

11. In an apparatus of the kind described, in combination, a pathway having means for supporting a spiral spring, having free end coils, on the outer periphery of the spring so that the spring can roll on its periphery on said pathway from a first location thereon to a second and a third location thereon, spaced from each other and from said first location longitudinally along said pathway, means including two pushing members for consecutively engaging the rear side of the spring at said first and second locations respectively for consecutively pushing the spring from said first location to said second location and from the second location to said third location, means at said second and third locations respectively for consecutively knotting said free end coils, and means at said second and third locations for consecutively positioning the spring for the respective knotting of said free end coils.

12. In an apparatus of the kind described, in combination, a pathway having means for supporting a spiral spring, having free end coils, so that the spring can travel on its periphery on said pathway from a first location thereon to a second location and a third location spaced from each other and from said first location longitudinally along said pathway, means including two oscillative pushing members for consecutively engaging the rear side of the spring, when said pushing members are moving in one direction, for pushing the spring from said first location to said second location, and from said second location to said third location, means at said second and third locations respectively for consecutively knotting said free end coils, and means at said second and third locations respectively for consecutively positioning the spring for the respective knotting of said free end coils.

13. In an apparatus of the kind described, in combination, a pathway having means for supporting a spiral spring, having free end coils, so that the spring can travel on its periphery on said pathway from a first location thereon to a second location and a third location, spaced from each other and from said first location longitudinally along said pathway, means for moving the spiral spring, so supported, from said first location to said second location, means at said second location for positioning the spring at one side of said pathway for the knotting of one free end coil of the spring, means at said second location for knotting said one free end coil, means for replacing the spring, with its endwise position unchanged, onto said pathway in said second location, means moving the spring on the pathway to said third location, means at said third location for positioning the spring at the other side of said pathway for the knotting of the other free end coil, and means at said third location for knotting said other free end coil.

14. In an apparatus of the kind described, in combination, a pathway having means for supporting a spiral spring, having a free end coil, so that the spring can travel on its periphery on said pathway from a first to a second location thereon, means for moving the spring, so supported, from the first to the second location, an abutment at one side of said pathway at said second location, means for stopping the spring at said second location with its axis transverse to said pathway and alined with said abutment, and its free end coil next adjacent to said abutment, means for engaging the stopped spring and for forcing said free end coil against said abutment, and for turning the spring on its axis in a direction in which the free end of said end coil leads, stop means located at said second location against which said free end of said end coil is adapted to strike thus positioning the spring for the knotting of said free end coil, and means at said second location for then knotting said free end coil.

15. In an apparatus of the kind described, in combination, a longitudinally reciprocative spinner head adapted to enter and having means for having driving engagement with a spiral spring, having a free end coil, an abutment alined with the axis of said spinner head, means for moving said spinner head toward said abutment for bringing the adjacent free end coil of the spring against said abutment, frictional means for rotating said spinner head on its axis for rotating the spring on its axis in the direction of rotation in which the free end of said free end coil leads, stop means in the orbit of said free end against which said free end is adapted to strike and hold the spring in position for knotting, and means for then knotting said positioned free end coil.

16. In an apparatus of the kind described, in combination, means for transferring a spiral spring having free end coils to a location and depositing the spring with its ends unobstructed and its axis transverse to its line of travel, knotting means at one side of and facing the line of travel at said location and having two spring positioning abutments, reciprocatory and rotary means at said location adapted to enter the end of the spring distant from said knotting means and to engage the inner periphery of and move the spring endwise toward and until the free end coil in advance strikes and is stopped by one of said abutments, and for turning the spring on its axis in a direction in which the free end of said end coil strikes the other of said abutments, thus positioning the spring for the knotting of said end coil by said knotting means, means for rotating said reciprocatory and rotary means in said direction, means for moving said reciprocatory and rotary means to so position the spring, and means for retracting and disengaging said reciprocatory and rotary means from said spring after the spring has been so positioned.

17. In an apparatus of the kind described, in combination, a rotary and reciprocative spinner head adapted to enter one end of a spiral spring having free end coils, and having means for frictionally engaging the inner periphery of the spring so as to be adapted to push the spring endwise and to rotate it in a direction in which the free end of the advance end coil leads, two abutments against one of which said head pushes the advance end coil, and the other abutment against which said free end of the said end coil strikes and thus positions the spring for the knotting operation, slip friction means for rotating said spinner head in said direction, means for moving said knotter head endwise in one direction for it to enter the spring and push it against the first named abutment, and means for disengaging the spinner head and withdrawing it from the spring when the spring has been so positioned for knotting.

CARL KIRCHNER.